United States Patent
Wu et al.

(10) Patent No.: US 12,001,612 B2
(45) Date of Patent: Jun. 4, 2024

(54) AIR GESTURE-BASED INTERACTION METHOD AND ELECTRONIC DEVICE

(71) Applicant: Huawei Technologies Co., Ltd., Shenzhen (CN)

(72) Inventors: Yizhen Wu, Shanghai (CN); Junwei Gou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/636,529

(22) PCT Filed: Aug. 18, 2020

(86) PCT No.: PCT/CN2020/109893
§ 371 (c)(1),
(2) Date: Feb. 18, 2022

(87) PCT Pub. No.: WO2021/032097
PCT Pub. Date: Feb. 25, 2021

(65) Prior Publication Data
US 2022/0269351 A1    Aug. 25, 2022

(30) Foreign Application Priority Data
Aug. 19, 2019  (CN) ......................... 201910765254.5

(51) Int. Cl.
*G06F 3/01*        (2006.01)
*G06F 3/04817*     (2022.01)
(Continued)

(52) U.S. Cl.
CPC .......... *G06F 3/017* (2013.01); *G06F 3/04817* (2013.01); *G06F 3/04847* (2013.01); *G06V 40/10* (2022.01); *G06V 40/28* (2022.01)

(58) Field of Classification Search
CPC ........ G06V 40/10; G06V 40/28; G06F 3/017; G06F 3/04817; G06F 3/04847
See application file for complete search history.

(56) References Cited

U.S. PATENT DOCUMENTS 7,692,627 B2 *  4/2010 Wilson ................. G06F 3/0425
                                                    345/173
10,042,445 B1 *  8/2018 Boelter .............. G06F 3/04845
(Continued)

FOREIGN PATENT DOCUMENTS

CN    103218042 A    7/2013
CN    103246351 A    8/2013
(Continued)

OTHER PUBLICATIONS

Wigdor, Daniel, et al., "Brave NUI World," Dec. 31, 2011, XP055947259, 7 pages.
(Continued)

*Primary Examiner* — Tadesse Hailu
(74) *Attorney, Agent, or Firm* — Conley Rose, P.C.

(57) ABSTRACT

An air gesture-based interaction method includes displaying, by an electronic device, a first display interface of a first application; detecting, by the electronic device by using a camera, a first air gesture input by a user; moving, by the electronic device, an indication icon on the first display interface along a moving trajectory of the first air gesture in a preset direction in response to the first air gesture; and displaying, by the electronic device, a second display interface of the first application in response to the first air gesture.

20 Claims, 24 Drawing Sheets

(51) Int. Cl.
*G06F 3/04847* (2022.01)
*G06V 40/10* (2022.01)
*G06V 40/20* (2022.01)

(56) References Cited

U.S. PATENT DOCUMENTS

| | | | |
|---|---|---|---|
| 10,042,510 B2* | 8/2018 | Holz | G06V 40/28 |
| 2008/0059578 A1* | 3/2008 | Albertson | G06F 3/016 |
| | | | 352/85 |
| 2008/0168403 A1 | 7/2008 | Westerman et al. | |
| 2008/0273755 A1* | 11/2008 | Hildreth | G06F 1/1626 |
| | | | 345/158 |
| 2010/0277438 A1* | 11/2010 | Kawashima | G06F 3/0488 |
| | | | 345/175 |
| 2010/0302188 A1 | 12/2010 | Bamford et al. | |
| 2011/0221666 A1* | 9/2011 | Newton | G06F 3/0304 |
| | | | 345/156 |
| 2012/0062558 A1* | 3/2012 | Lee | G06F 3/017 |
| | | | 345/419 |
| 2012/0218192 A1 | 8/2012 | Lazaridis et al. | |
| 2012/0242793 A1* | 9/2012 | Im | G06F 3/011 |
| | | | 348/46 |
| 2012/0274550 A1* | 11/2012 | Campbell | G06F 3/0304 |
| | | | 345/156 |
| 2013/0141326 A1 | 6/2013 | Liou et al. | |
| 2014/0129990 A1* | 5/2014 | Xin | G06F 3/04815 |
| | | | 715/849 |
| 2014/0201684 A1 | 7/2014 | Holz | |
| 2016/0026375 A1* | 1/2016 | Wu | G06F 3/0446 |
| | | | 715/765 |
| 2016/0073017 A1* | 3/2016 | Ogasawara | G06F 3/04883 |
| | | | 463/31 |
| 2016/0073033 A1* | 3/2016 | Ogasawara | A63F 13/92 |
| | | | 348/207.1 |
| 2016/0231807 A1* | 8/2016 | Ogasawara | H04N 23/64 |
| 2016/0232404 A1* | 8/2016 | Kitazono | G06F 3/03547 |
| 2016/0232675 A1* | 8/2016 | Ogasawara | A63F 13/213 |
| 2017/0228120 A1* | 8/2017 | Phillips | G06F 3/04883 |
| 2018/0349484 A1* | 12/2018 | Carlisle | G06F 16/9535 |
| 2018/0357479 A1* | 12/2018 | Swaminathan | G06V 40/28 |
| 2019/0073040 A1* | 3/2019 | Luchner | G06F 3/016 |
| 2020/0066041 A1* | 2/2020 | Qian | G06V 40/107 |
| 2020/0233568 A1 | 7/2020 | Wang | |
| 2022/0137713 A1 | 5/2022 | Hu et al. | |

FOREIGN PATENT DOCUMENTS

| | | |
|---|---|---|
| CN | 103558920 A | 2/2014 |
| CN | 103648008 A | 3/2014 |
| CN | 104142730 A | 11/2014 |
| CN | 104407705 A | 3/2015 |
| CN | 106055098 A | 10/2016 |
| CN | 107918481 A | 4/2018 |
| CN | 109491584 A | 3/2019 |
| CN | 109725724 A | 5/2019 |
| CN | 109725727 A | 5/2019 |
| CN | 110045819 A | 7/2019 |
| EP | 2660682 A2 * 11/2013 ........... G06F 1/1626 |
| WO | 2014207288 A1 | 12/2014 |
| WO | 2019061541 A1 | 4/2019 |

OTHER PUBLICATIONS

ITU-T H.264, Jun. 2019, "Series H: Audiovisual and Multimedia Systems, Infrastructure of audiovisual services-Coding of moving video, Advanced video coding for generic audiovisual services," 836 pages.

* cited by examiner

AIR GESTURE-BASED INTERACTION METHOD AND ELECTRONIC DEVICE

CROSS-REFERENCE TO RELATED APPLICATIONS

This is a U.S. National Stage of International Patent Application No. PCT/CN2020/109893 filed Aug. 18, 2020, which claims priority to Chinese Patent Application No. 201910765254.5 filed Aug. 19, 2019. Both of the aforementioned applications are hereby incorporated by reference in their entireties.

TECHNICAL FIELD

This application relates to the field of terminal technologies, and in particular, to an air gesture-based interaction method and an electronic device.

BACKGROUND

With continuous development of electronic technologies, there is no longer a limitation that to use an electronic device such as a mobile phone, a user needs to perform an operation by touching a touchscreen. Currently, some mobile phones may recognize, by using a component such as a camera or an ultrasonic sensor, a gesture action (namely, an air gesture) performed by a user in three-dimensional space, to implement an air operation on some functions of the mobile phone.

For example, the user browses an electronic book app in the mobile phone. In this case, the mobile phone may recognize, by using an image collected by using the camera, an air gesture performed by the user. For example, if detecting that the user performs a first air gesture of waving to the left, the mobile phone may perform, in response to the first air gesture, a first operation of "turning to a previous page" in the electronic book app. If detecting that the user performs a second air gesture of waving to the right, the mobile phone may perform, in response to the second air gesture, a second operation of "turning to a next page" in the electronic book app.

Usually, after the mobile phone performs a corresponding operation in response to an air gesture input by the user, the user may sense that the mobile phone successfully receives the air gesture input by the user. However, in a process of inputting the air gesture to the mobile phone by the user, the user cannot sense whether the mobile phone detects the air gesture input by the user, and consequently the user cannot determine whether the currently input air gesture is correct. Therefore, there is poor user experience when the user performs air interaction with the mobile phone, and there is a high misoperation rate.

SUMMARY

This application provides an air gesture-based interaction method and an electronic device, to improve user experience when a user performs air interaction with an electronic device, and reduce a misoperation rate of an air gesture.

To achieve the foregoing objective, the following technical solutions are used in this application.

According to a first aspect, this application provides an air gesture-based interaction method, including: An electronic device displays a first display interface of a first application; the electronic device may detect, by using a camera, a first air gesture input by a user; the electronic device may move an indication icon on the first display interface along a moving trajectory of the first air gesture in a preset direction in response to the first air gesture; and the electronic device may display a second display interface of the first application in response to the first air gesture.

In this way, in a process of inputting an air gesture (for example, the first air gesture) by the user, the electronic device may direct, by moving the indication icon in the preset direction, the user to complete the current air gesture, and the user may sense an execution progress of the current air gesture in real time based on the moving of the indication icon. Therefore, user experience is improved when the user performs air interaction with the electronic device, and a misoperation rate of the air gesture is reduced.

In a possible implementation, the preset direction may be a direction of an x axis of a rectangular coordinate system, and the direction of the x axis is a horizontal direction in which the user normally uses the electronic device. In this case, that the electronic device moves an indication icon on the first display interface along a moving trajectory of the first air gesture in a preset direction specifically includes: The electronic device determines a first moving distance of the first air gesture in the direction of the x axis; and then the electronic device may move the indication icon in the direction of the x axis on the first display interface based on the first moving distance. For example, the electronic device may move the indication icon in the direction of the x axis based on the first moving distance and a proportionality coefficient k, and prompt the user with an execution progress of the current air gesture in the direction of the x axis by moving the indication icon.

In a possible implementation, the preset direction may be a direction of a y axis of a rectangular coordinate system. In this case, that the electronic device moves an indication icon on the first display interface along a moving trajectory of the first air gesture in a preset direction specifically includes: The electronic device determines a second moving distance of the first air gesture in the direction of the y axis; and then the electronic device may move the indication icon in the direction of the y axis on the first display interface based on the second moving distance. For example, the electronic device may move the indication icon in the direction of the y axis based on the second moving distance and a proportionality coefficient k, and prompt the user with an execution progress of the current air gesture in the direction of the y axis by moving the indication icon.

In a possible implementation, before the electronic device detects, by using the camera, the first air gesture input by the user, the method further includes: The electronic device detects that the user inputs a first preset gesture, where the first preset gesture is used to enter an air gesture operation mode; and the electronic device displays the indication icon at a preset position of the first display interface in response to the first preset gesture. In this way, the user may learn that the electronic device enters the air gesture operation mode, and therefore the user is indicated to start inputting a corresponding air gesture.

In a possible implementation, that the electronic device displays the indication icon at a preset position of the first display interface includes: The electronic device displays the indication icon on a top or at a bottom of the first display interface; or the electronic device displays the indication icon on a side edge of the first display interface.

In a possible implementation, the first preset gesture may be a preset hover gesture, and that the electronic device detects that the user inputs a first preset gesture includes: The electronic device detects, by using an image collected by the camera, that the user inputs the hover gesture. Certainly, the electronic device may detect, in a manner such as a voice manner, an operation intention, of the user, that the air gesture operation mode is to be entered.

In a possible implementation, that the electronic device detects, by using a camera, a first air gesture input by a user includes: The electronic device detects, by using a position at which the hover gesture hovers as a start position and by using an image collected by the camera, the first air gesture input by the user.

In a possible implementation, that the electronic device displays a second display interface of the first application includes: The electronic device reports a sliding event to the first application based on the moving distance of the first air gesture in the preset direction; and the first application in the electronic device displays the second display interface corresponding to the sliding event.

In a possible implementation, the method further includes: After the first air gesture ends, the electronic device restores display of the indication icon at the preset position. In this way, the user is prompted with information indicating that the currently input first air gesture ends, and the electronic device responds to the first air gesture.

In a possible implementation, the method further includes: After the first air gesture ends, the electronic device may detect, by using the camera, a second air gesture input by the user; the electronic device may move the indication icon along a moving trajectory of the second air gesture in the preset direction in response to the second air gesture; and the electronic device may display a third display interface of the first application in response to the second air gesture.

In a possible implementation, that the electronic device detects, by using the camera, a second air gesture input by the user includes: After the first air gesture ends, the electronic device detects a backhaul operation of the first air gesture by using an image collected by the camera; and to prevent the electronic device from being interfered with the backhaul operation of the first air gesture in recognizing the second air gesture, the electronic device may detect, by using a position at which the backhaul operation ends as a start position and by using an image collected by the camera, the second air gesture input by the user.

In a possible implementation, the method further includes: The electronic device detects that the user inputs a second preset gesture, where the second preset gesture is used to exit the air gesture operation mode; and the electronic device hides the displayed indication icon in response to the second preset gesture. In this way, the user is prompted with information indicating that the air gesture operation mode is exited.

In a possible implementation, the indication icon may be specifically a progress bar, a slider, a line segment, or an arc, and that the electronic device moves an indication icon on the first display interface along a moving trajectory of the first air gesture in a preset direction includes: The electronic device slides, extends, or enlarges the indication icon based on the moving trajectory of the first air gesture in the preset direction.

According to a second aspect, this application provides an electronic device, including a touchscreen, a camera, one or more processors, a memory, and one or more computer programs. The processor is coupled to each of the touchscreen, the camera, and the memory. The one or more computer programs are stored in the memory. When the electronic device runs, the processor executes the one or more computer programs stored in the memory, so that the electronic device performs the air gesture-based interaction method according to any one of the first aspect and the possible implementations of the first aspect.

According to a third aspect, this application provides a computer storage medium, including computer instructions, and when the computer instructions are run on an electronic device, the electronic device is enabled to perform the air gesture-based interaction method according to any one of the first aspect and the possible implementations of the first aspect.

According to a fourth aspect, this application provides a computer program product, and when the computer program product is run on an electronic device, the electronic device is enabled to perform the air gesture-based interaction method according to any one of the first aspect and the possible implementations of the first aspect.

It may be understood that the electronic device in the second aspect, the computer storage medium in the third aspect, and the computer program product in the fourth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described again herein.

DESCRIPTION OF EMBODIMENTS

The following describes implementations of the embodiments in detail with reference to the accompanying drawings.

For example, an air gesture-based interaction method provided in the embodiments of this application may be applied to an electronic device such as a mobile phone, a tablet computer, a notebook computer, an ultra-mobile personal computer (ultra-mobile personal computer, UMPC), a handheld computer, a netbook, a personal digital assistant (personal assistant digital, PDA), a wearable electronic device, a vehicle-mounted device, or a virtual reality device. This is not limited in the embodiments of this application.

Figure 1:
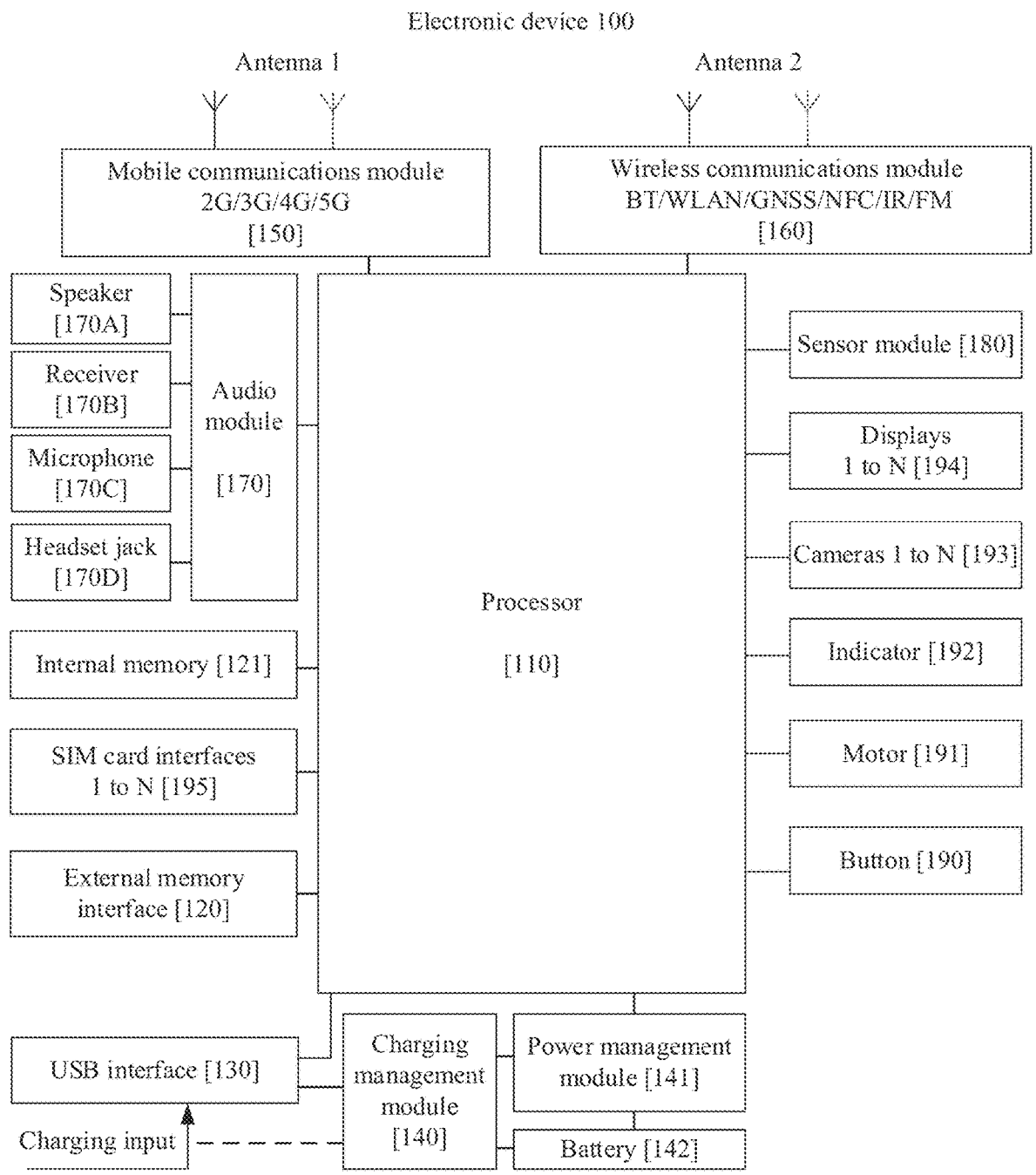
FIG. 1 is a first schematic diagram of a structure of an electronic device according to an embodiment of this application.

For example, FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170B, a sensor module 180, a camera 193, a display 194, and the like.

It can be understood that the structure shown in this embodiment of the present invention does not constitute a specific limitation on the electronic device 100. In other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data in the memory. This avoids repeated access and reduces waiting time of the processor 110. Therefore, system efficiency is improved.

The charging management module 140 is configured to receive a charging input from a charger. The charger may be a wireless charger or a wired charger.

The power management module 141 is configured to connect the battery 142 and the charging management module 140 to the processor 110. The power management module 141 may receive an input of the battery 142 and/or an input of the charging management module 140, and supply power to the processor 110, the internal memory 121, the display 194, the camera 193, the wireless communications module 160, and the like.

The power management module 141 may be configured to monitor performance parameters such as a battery capacity, a battery cycle count, a battery charging voltage, a battery discharging voltage, and a battery state of health (for example, electric leakage and impedance).

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals.

The mobile communications module 150 may provide a wireless communication solution that includes 2G/3G/4G/5G or the like and that is applied to the electronic device 100. The mobile communications module 150 may include one or more filters, one or more switches, one or more power amplifiers, one or more low noise amplifiers (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 and at least some modules in the processor 110 may be disposed in a same device.

The wireless communications module 160 may provide a wireless communication solution that is applied to the electronic device 100 and that includes a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrated with one or more communication processing modules. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. In some embodiments, the mobile phone 100 may include one or N cameras, where N is a positive integer greater than 1. The camera 193 may be a front-facing camera or a rear-facing camera.

Figure 2:
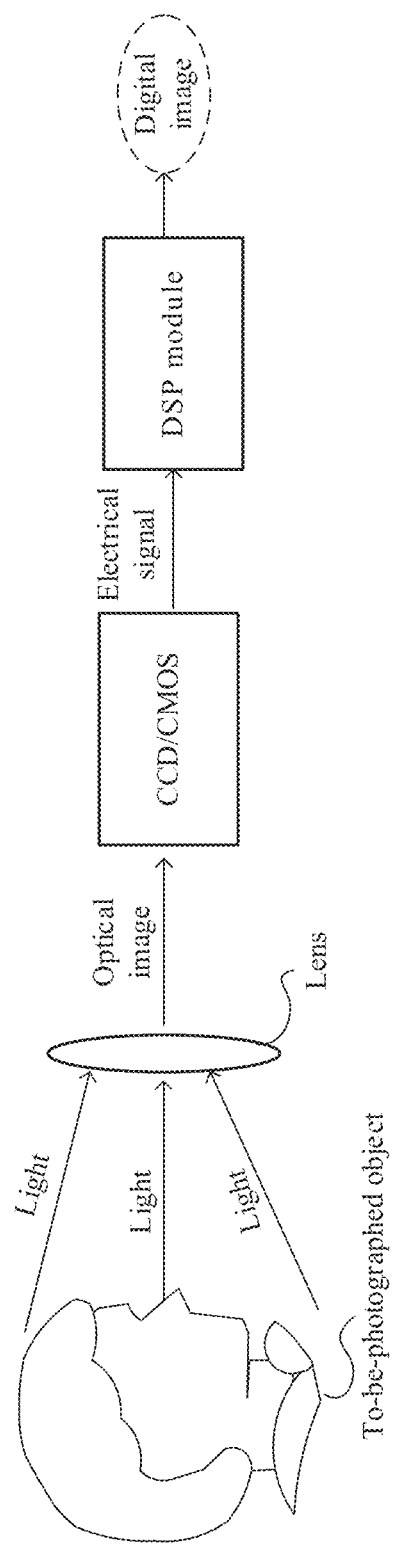
FIG. 2 is a schematic diagram of a photographing principle of a camera according to an embodiment of this application.

As shown in FIG. 2, the camera 193 usually includes a lens (lens) and a photosensitive element (sensor). The photosensitive element may be any photosensitive element such as a charge-coupled device (charge-coupled device, CCD) or a complementary metal oxide semiconductor (complementary metal oxide semiconductor, CMOS).

Still as shown in FIG. 2, in a process of capturing a photo or a video, an optical image may be generated after reflected light of a to-be-photographed object passes through a lens. The optical image is projected onto a photosensitive element, and the photosensitive element converts a received optical signal into an electrical signal. The camera 193 then sends the obtained electrical signal to a DSP (Digital Signal Processing, digital signal processing) module for digital signal processing, and finally obtains each frame of digital image.

In this embodiment of this application, the camera 193 may be configured to collect an air gesture input by a user. For example, the camera 193 may be set to an always-on (always on) state to collect a current image in real time. The camera 193 may send each frame of collected image to the processor 110. If it is recognized, from the collected image, that the user performs a preset enabling gesture, it indicates that the user wants to interact with the electronic device by using an air gesture. In this case, the processor 110 may recognize, based on an image sent by the camera 193 in real time, a specific air gesture currently input by the user.

For example, the preset enabling gesture may be a gesture in which a palm hovers for 200 ms. In this case, if an image collected by the camera 193 in recent 200 ms includes a pattern of the palm of the user, and the palm of the user does not move significantly, the processor 110 may determine that the user performs the preset enabling gesture. Then, the camera 193 may continue to send each frame of collected image to the processor 110, and the processor 110 may determine, based on a plurality of frames of images sent by the camera 193, that an air gesture currently input by the user is sliding upward, sliding downward, sliding to the left, sliding to the right, or the like. It should be noted that in this embodiment of this application, "up", "down", "left", and "right" are all directions relative to a direction in which the user normally uses a mobile phone, and may be understood with reference to accompanying drawings of specific embodiments. This is not limited in this embodiment of this application.

For example, the electronic device is a mobile phone. A first coordinate system may be preset in the mobile phone, and the first coordinate system includes an x axis and a y axis. A direction of the x axis is a horizontal direction in which the mobile phone normally displays content, namely, a horizontal direction in which the user normally reads content displayed by the mobile phone. Correspondingly, the y axis is a vertical direction perpendicular to the x axis. For example, the x axis is a horizontal direction along a short edge of a screen of the mobile phone, and the y axis is a vertical direction along a long edge of the screen of the mobile phone. The processor 110 may determine a moving distance of the palm of the user in the x axis and a moving distance of the palm of the user in the y axis based on a position change of a point on the palm of the user in a plurality of consecutive frames of images. If the moving distance of the palm of the user in the x axis is greater than a threshold 1, the processor 110 may determine that the user performs an air gesture of sliding to the left (or to the right). If the moving distance of the palm of the user in the y axis is greater than a threshold 2, the processor 110 may determine that the user performs an air gesture of sliding upward (or downward).

Figure 3:
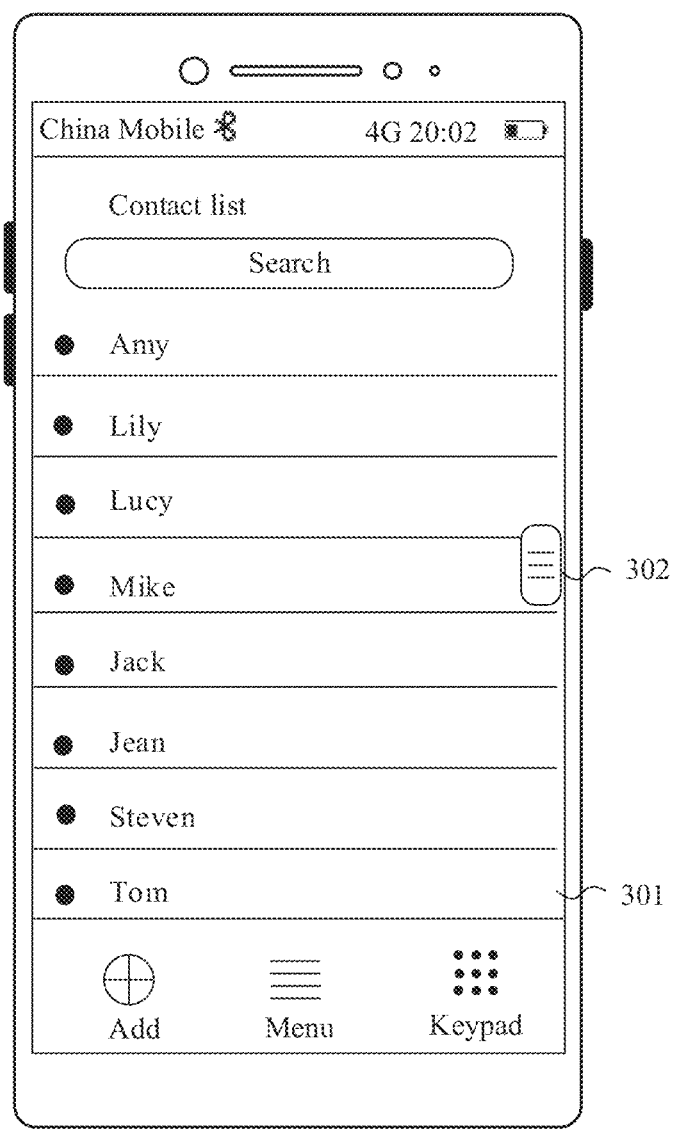
FIG. 3 is a schematic diagram 1 of an application scenario of an air gesture-based interaction method according to an embodiment of this application.

In this embodiment of this application, the processor 110 may determine, in real time, the air gesture input by the user, and may indicate the display 194 to display an execution progress of the air gesture in real time. An air gesture of sliding downward is used as an example. After the processor 110 determines that the user performs the preset enabling gesture, as shown in FIG. 3, the processor 110 may indicate the display 194 to display a slider 302 on a currently displayed interface 301, to prompt the user with information indicating that an air gesture operation mode is entered. In a process of detecting the air gesture that is of sliding downward and that is input by the user, the processor 110 may indicate the display 194 to slide the slider 302 downward in real time.

In this way, in a process of inputting an air gesture by the user, the electronic device may direct, by moving the slider 302, the user to complete the current air gesture, and the user may sense an execution progress of the current air gesture in real time based on the moving of the slider 302. Therefore, user experience is improved when the user performs air interaction with the electronic device, and a misoperation rate of the air gesture is reduced.

In addition, when detecting a specific air gesture input by the user, the processor 110 may perform a corresponding operation such as turning to a page, going back, or performing a next step in response to the air gesture. This is not limited in this embodiment of this application. In this way, the user can control, by using the air gesture, the electronic device to implement a corresponding function.

It should be noted that in addition to the camera 193, the electronic device may collect, by using one or more components such as an infrared sensor and an ultrasonic sensor, the air gesture input by the user. This is not limited in this embodiment of this application.

The digital signal processor is configured to process a digital signal, and may further process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of encoding formats, for example, moving picture experts group (moving picture experts group, MPEG)-1, MPEG-2, MPEG-3, and MPEG-4.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 100 performs a method provided in some embodiments of this application, various functional applications, data processing, and the like. The internal memory 121 may include a program storage area and a data storage area. The program storage area may store an operating system. The program storage area may further store one or more applications (for example, Gallery and Contacts) and the like. The data storage area may store data (such as photos and contacts) created in a process of using the electronic device 100, and the like. In addition, the internal memory 121 may include a high-speed random access memory, and may further include a non-volatile memory, for example, one or more magnetic disk storage devices, a flash memory, or a universal flash storage (universal flash storage, UFS). In some other embodiments, the processor 110 runs the instructions stored in the internal memory 121 and/or the instructions stored in the memory disposed in the processor, so that the electronic device 100 performs the method provided in the embodiments of this application, various functional applications, and data processing.

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving the mouth close to the microphone 170C to input a sound signal to the microphone 170C. One or more microphones 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. This is not limited in this embodiment of this application.

Certainly, the electronic device 100 provided in this embodiment of this application may further include one or more components such as a button 190, a motor 191, an indicator 192, and a SIM card interface 195. This is not limited in this embodiment of this application.

A layered architecture, an event-driven architecture, a micro-core architecture, a micro-service architecture, or a cloud architecture may be used for a software system of the electronic device 100. In an embodiment of this application, an Android system with a layered architecture is used as an example to describe a software structure of the electronic device 100.

Figure 4:
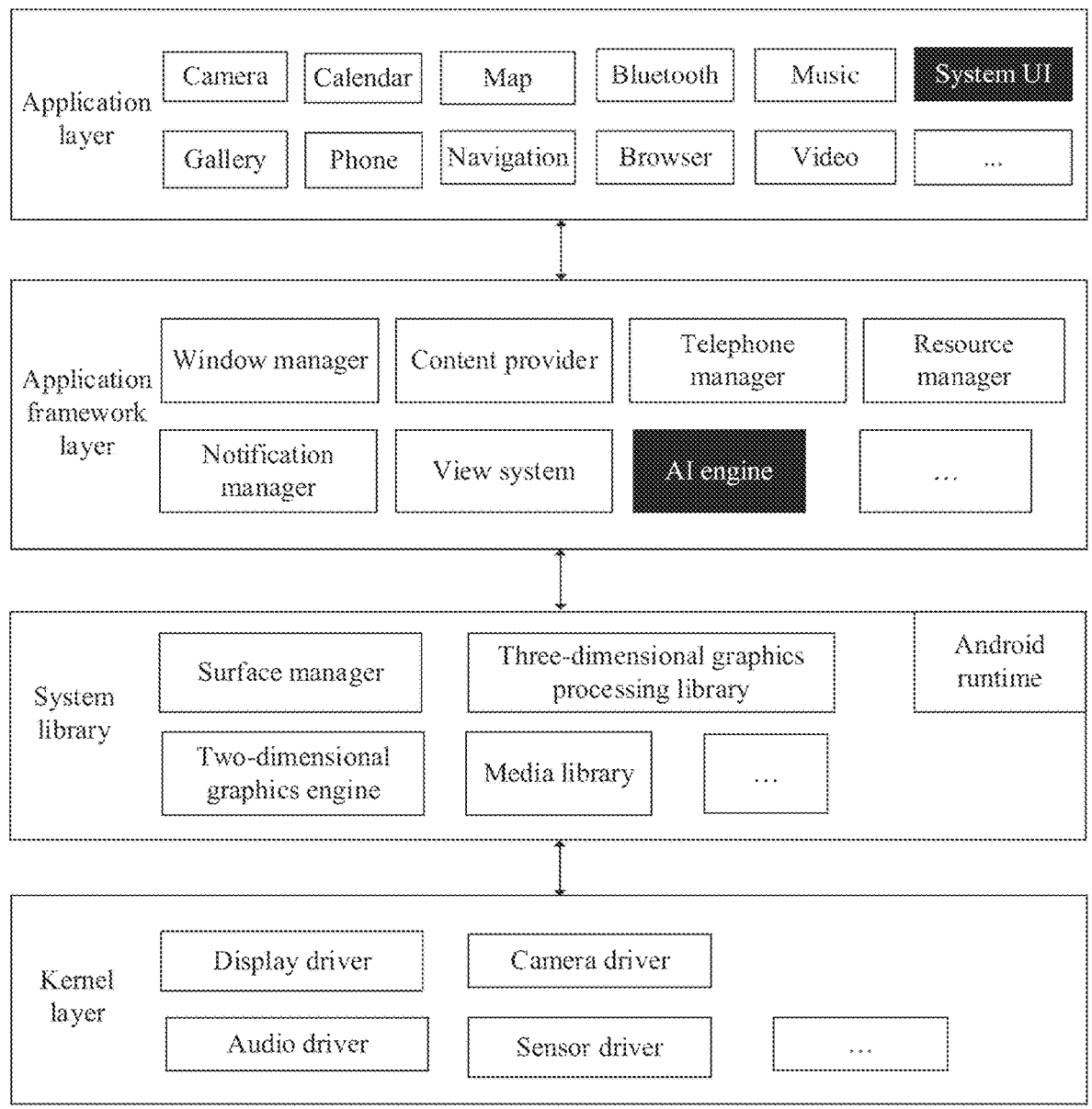
FIG. 4 is a schematic diagram of an architecture of an operating system in an electronic device according to an embodiment of this application.

FIG. 4 is a block diagram of a software structure of an electronic device 100 according to an embodiment of this application.

In the layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom.

The application layer may include a series of application packages.

As shown in FIG. 4, apps (application, application) such as Phone, Memo, Browser, Contacts, Camera, Gallery, Calendar, Map, Bluetooth, Music, Video, and Messaging may be installed at the application layer.

In addition, the application layer further includes an Android core application such as a system UI. The system UI may be configured to: feed back a system status and an application status, and maintain interaction with a user.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

In this embodiment of this application, still as shown in FIG. 4, the application framework layer may further include an AI engine. The AI engine may be configured to recognize, in real time based on an image collected by a camera, an air gesture input by the user. After recognizing the air gesture input by the user, the AI engine may further transfer the air gesture to a related application at the application layer, so that the application can perform a corresponding operation in response to the air gesture input by the user. It may be understood that in this embodiment of this application, a specific name of the AI engine is not limited, and a functional module with any name may be disposed at the application framework layer to perform the function.

For example, a working status of the AI engine may include a normal mode and an air gesture mode.

In the normal mode, the AI engine may determine, based on an image collected by the camera in real time, whether the user inputs an enabling gesture of the air gesture mode, that is, whether the user has an operation intention of enabling an air gesture. For example, the AI engine may obtain, by invoking a camera driver at the kernel layer, each frame of image collected by the camera in real time, and then the AI engine may recognize, based on these images, whether the user inputs the preset enabling gesture. For example, the preset enabling gesture may be a gesture in which a palm hovers for 200 ms. In this case, the AI engine may continuously obtain N (N>1) frames of images collected in recent 200 ms, and recognize whether the N frames of images include a pattern of the palm of the user. If the N frames of images include the pattern of the palm of the user, and a moving distance of the palm of the user in the N frames of images is less than a threshold, the AI engine may determine that the user currently inputs the enabling gesture.

Figure 5A:
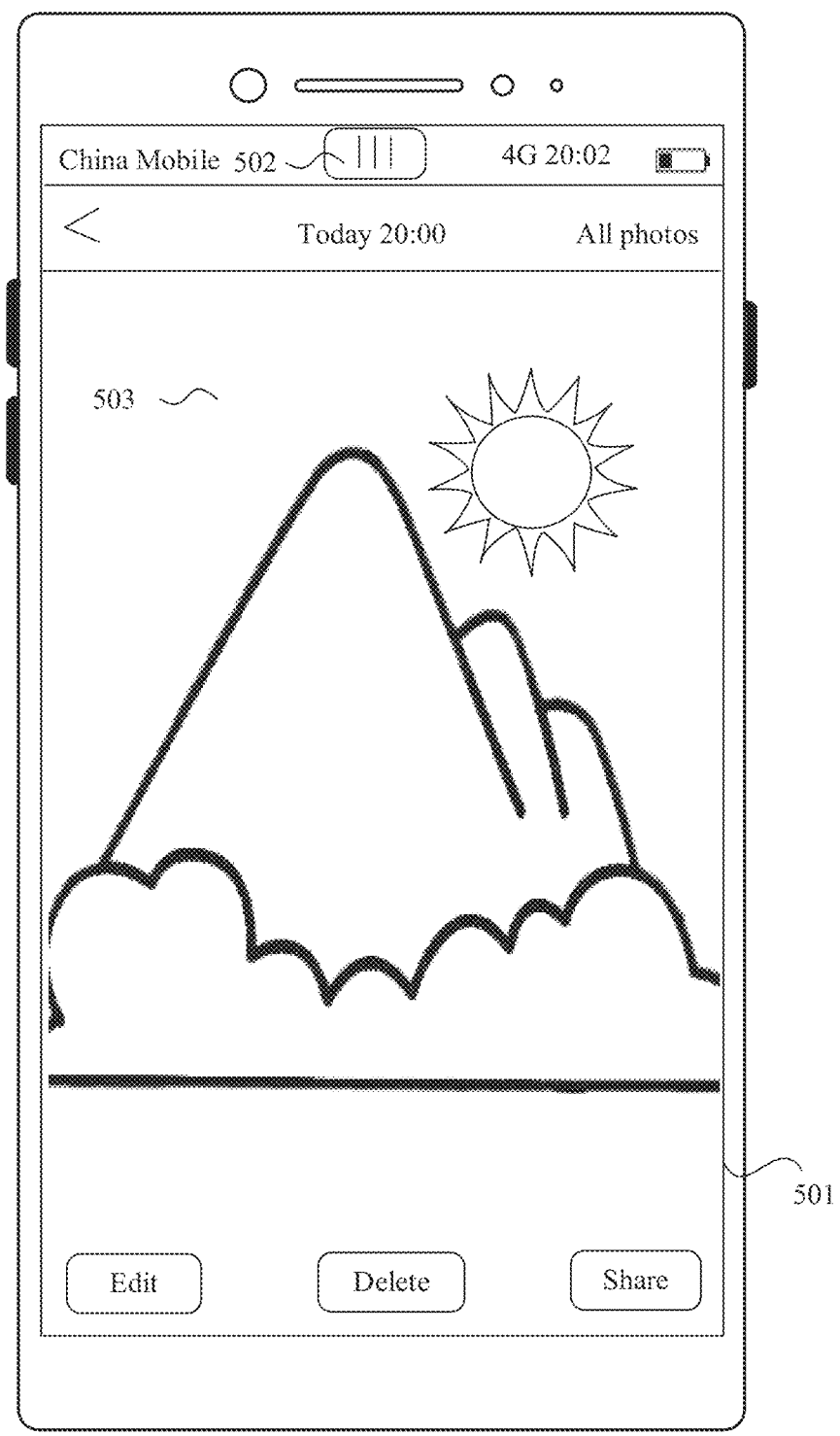
FIG. 5(a) and FIG. 5(b) are a schematic diagram 2 of an application scenario of an air gesture-based interaction method according to an embodiment of this application.

After determining that the user inputs the enabling gesture, the AI engine may report a first event to the system UI at the application framework layer. The first event may be used to indicate to enable the air gesture mode. After the system UI receives the first event, as shown in FIG. 5(a), the system UI may display an air gesture indication icon 502 at a preset position of a current display interface 501. The indication icon 502 may be used to prompt the user with information indicating that the enabling gesture is detected, and an air gesture input by the user starts to be detected. The indication icon 502 may be specifically a pattern such as a progress bar or a slider. A display effect such as a size, a position, a shape, and a color of the indication icon 502 is not limited in this embodiment of this application.

In addition, after the AI engine determines that the user inputs the enabling gesture, the AI engine enters the air gesture mode from the normal mode.

In the air gesture mode, the AI engine may determine, based on an image collected by the camera in real time, a specific air gesture input by the user. For example, the AI engine may obtain, by invoking the camera driver at the kernel layer, each frame of image collected by the camera in real time, and then the AI engine may recognize, based on a moving distance of a gesture of the user in these images, the air gesture input by the user. For example, the AI engine may use a position, of the palm of the user, that is obtained when the user performs the enabling gesture as an initial position A, and then the AI engine may calculate moving distances of the palm of the user in a direction of an x axis and a direction of a y axis based on an image collected in real time and by using the initial position A as a start point. In this way, the AI engine may further determine, based on the moving distances of the palm of the user in the direction of the x axis and the direction of the y axis, that the user currently outputs an air gesture of sliding upward, sliding downward, sliding to the left, or sliding to the right.

Figure 5B:
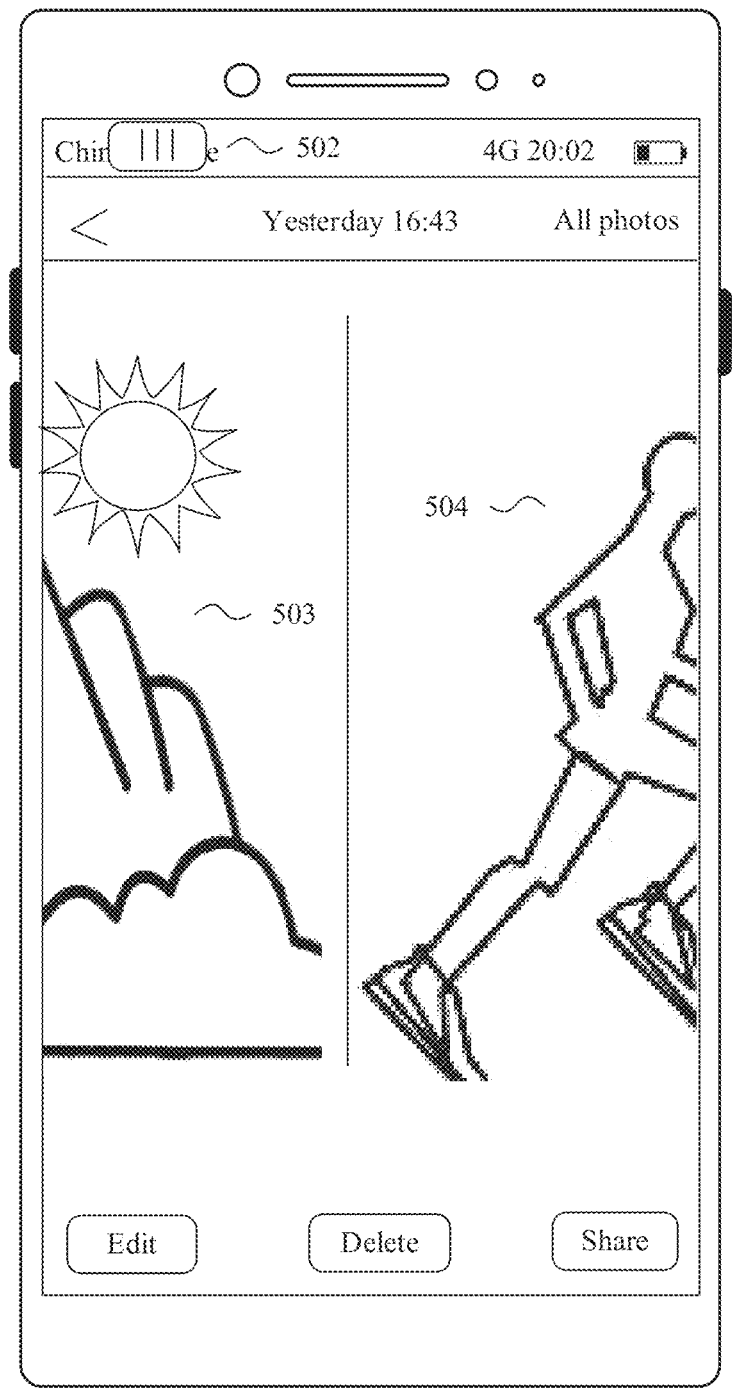

For example, the user inputs an air gesture of sliding to the left. After determining that the user currently inputs the air gesture of sliding to the left, the AI engine may report a corresponding sliding event to the system UI and an album app that currently runs in foreground. In this case, as shown in FIG. 5(b), after receiving the sliding event, the album app may start to display a next picture 504 after a current picture 503 in response to the sliding event. In addition, after receiving the sliding event, the system UI may slide the indication icon 502 to the left in response to the sliding event. For example, a sliding distance of the indication icon 502 is directly proportional to a moving distance of the air gesture currently input by the user.

In this way, when controlling a related application by using the air gesture, the user may further learn of an execution progress of the current air gesture in real time by using the indication icon 502 on the display interface, and the mobile phone may direct, in real time by using the indication icon 502, the user to complete the current air gesture. Therefore, user experience is improved when the user performs air interaction with a mobile phone, and a misoperation rate of the air gesture is reduced.

In addition, when the user no longer wants to interact with the mobile phone by using the air gesture, the user may further input an end gesture of the air gesture mode to the camera. For example, the end gesture may be a gesture in which the user clenches a fist and hovers for 200 ms. In this case, when the AI engine determines, based on an image collected by the camera, that the user inputs the preset end gesture, the AI engine may switch from the air gesture mode to the normal mode. In addition, the AI engine may report a second event to the system UI, and the second event may be used to indicate to end the air gesture mode. After receiving the second event, the system UI may hide the indication icon 502 on the current display interface, to prompt the user with information indicating that the air gesture operation mode is exited.

In addition, the window manager is configured to manage a window application. The window manager may obtain a size of a display, determine whether there is a status bar, perform screen locking, take a screenshot, and the like. The content provider is configured to: store and obtain data, and make the data accessible to an application. The data may include a video, an image, audio, calls that are made and received, a browsing history and bookmarks, a phone book, and the like. The view system includes a visual control, for example, a control for displaying text or a control for displaying a picture. The view system may be configured to construct an application. A display interface may include one or more views. For example, a display interface including a notification icon of Messages may include a text display view and a picture display view. The phone manager is configured to provide a communication function of the electronic device 100, for example, management of a call status (including answering or declining a call). The resource manager provides various resources for an application, such as a localized character string, an icon, a picture, a layout file, and a video file. The notification manager enables an application to display notification information in a status bar, and may be configured to convey a notification type message, where the displayed notification information may automatically disappear after a short pause and require no user interaction. For example, the notification manager is configured to notify download completion, and provide a message notification. The notification manager may alternatively be a notification that appears in the status bar at the top of the system in a form of a graph or a scrollbar text, for example, a notification of an application running on the background or a notification that appears on the screen in a form of a dialog window. For example, text information is displayed in the status bar, an alert sound is given, the electronic device vibrates, or an indicator blinks.

As shown in FIG. 4, the system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports play and recording of a plurality of frequently used audio and video formats, static image files, and the like. The media library may support a plurality of audio and video encoding formats, for example, MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a core library and a virtual machine. The Android runtime is responsible for scheduling and management of the Android system.

The core library includes two parts: a function that needs to be invoked in Java language and a core library of Android.

The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The kernel layer is a layer between hardware and software. The kernel layer includes at least a display driver, a camera driver, an audio driver, a sensor driver, and the like. This is not limited in this embodiment of this application.

Figure 6:
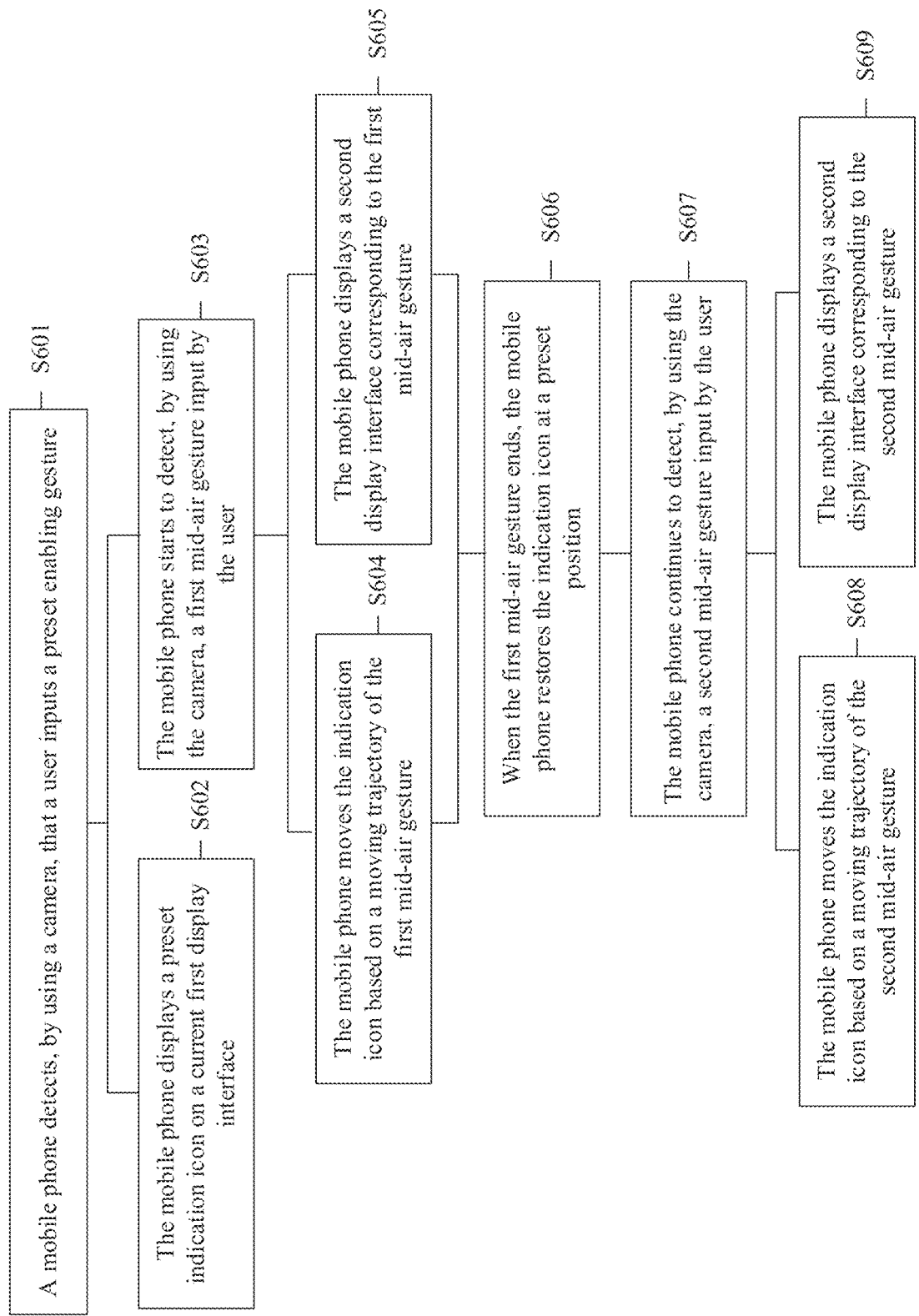
FIG. 6 is a schematic flowchart of an air gesture-based interaction method according to an embodiment of this application.

An air gesture-based interaction method provided in an embodiment of this application is described below in detail by using an example in which an electronic device is a mobile phone. As shown in FIG. 6, the method includes the following steps.

S601. The mobile phone detects, by using a camera, that a user inputs a preset enabling gesture.

For example, the camera of the mobile phone may be set to an always-on state. That is, the camera of the mobile phone may be always in a working state, and the camera may collect an image in a shooting range based on a specific working frequency. For example, the camera may be a 3D camera (which may also be referred to as a depth camera or a depth-of-field camera), and the mobile phone may obtain a distance between an object or a user in an image captured by the 3D camera and the mobile phone by using the image.

Figure 7:
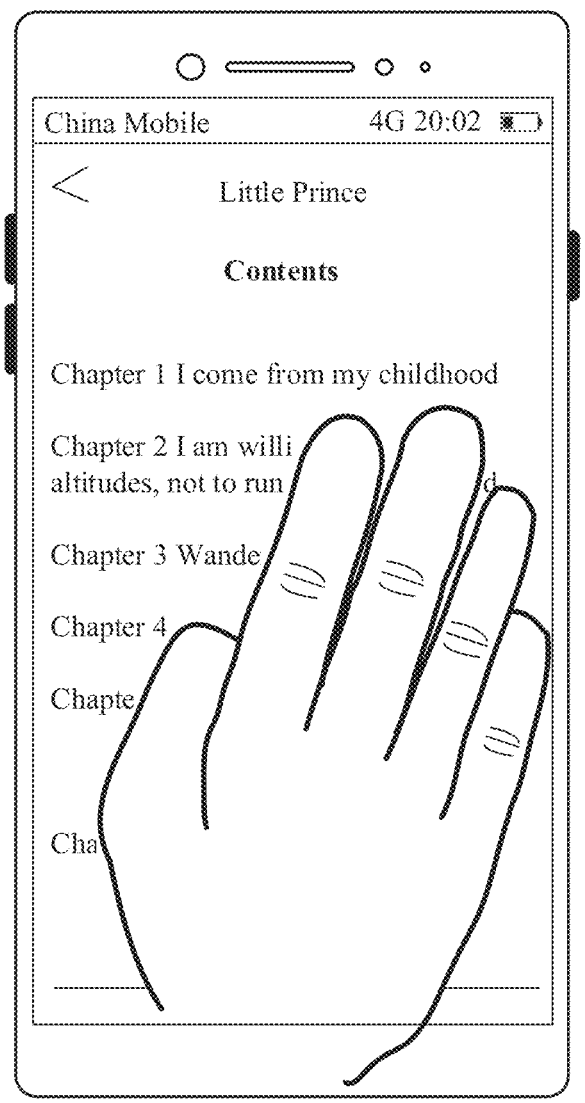
FIG. 7 is a schematic diagram 3 of an application scenario of an air gesture-based interaction method according to an embodiment of this application.

Usually, for the mobile phone, it may be considered by default that an air gesture function of the mobile phone is disabled to reduce power consumption of the mobile phone. In this case, the camera of the mobile phone is still in the working state. When the user wants to interact with the mobile phone by using an air gesture, as shown in FIG. 7, an enabling gesture of the air gesture may be input in the shooting range of the camera (for example, a front-facing camera) of the mobile phone. For example, the enabling gesture may be a gesture in which a palm of the user hovers for 200 ms. The camera of the mobile phone is in the always-on state, and therefore the camera may collect a plurality of frames of images when the palm of the user hovers, and the mobile phone may recognize, based on the plurality of frames of images collected by the camera, whether the user currently inputs the enabling gesture.

Figure 8:
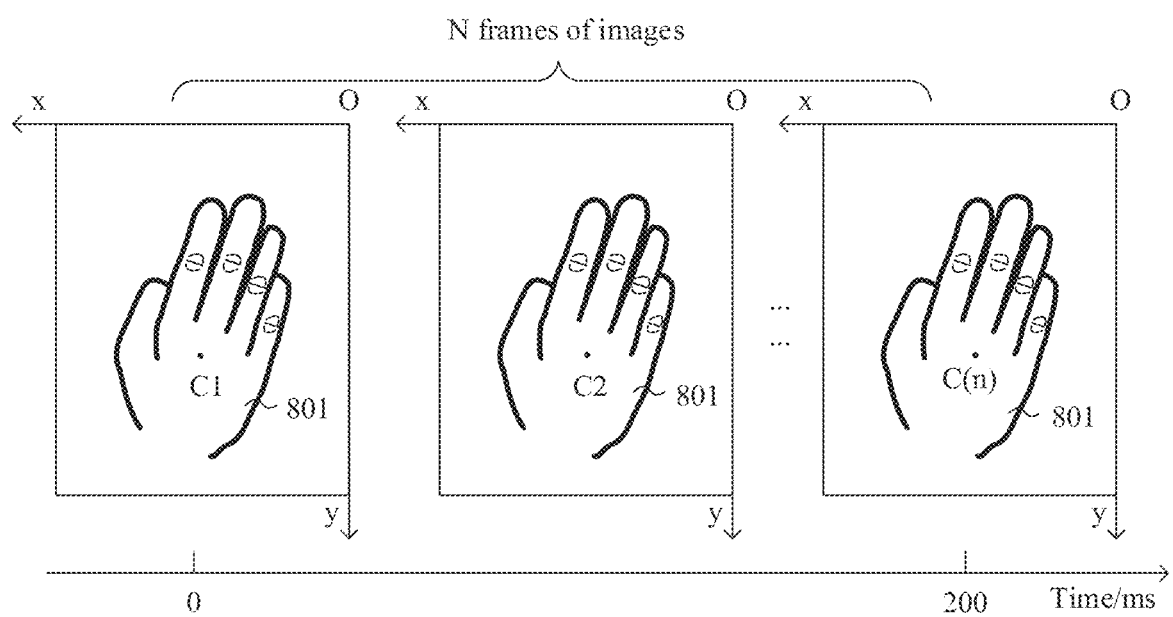
FIG. 8 is a schematic diagram 4 of an application scenario of an air gesture-based interaction method according to an embodiment of this application.

For example, the enabling gesture is still the gesture in which the palm of the user hovers for 200 ms. As shown in FIG. 8, the mobile phone may obtain, in real time, N frames of images collected by the camera in recent 200 ms. In addition, a two-dimensional rectangular coordinate system (or a spatial rectangular coordinate system) may be preset in the mobile phone. Still as shown in FIG. 8, for example, an x axis and a y axis are established by using an upper right corner of each frame of image as an origin O. The x axis and the y axis may be in units of pixels, or a distance unit of mm or cm may be set. The mobile phone may recognize a pattern 801 of the palm of the user and a reference point C in the pattern 801 in each of the N frames of images. The reference point C is any point in the pattern 801. For example, the reference point C may be a central point of the pattern 801, or the reference point C may be an endpoint of an index finger of the user.

If each of the N frames of images includes the pattern 801, or a quantity of images that include the pattern 801 in the N frames of images is greater than a preset value 1, it indicates that the palm of the user always appears in the shooting range of the camera in the 200 ms. In addition, the mobile phone may calculate a moving distance of the palm of the user based on coordinates of reference points C1, C2, ..., and C(n) in the N frames of images. If the moving distance of the palm of the user is less than a preset value 2 (for example, the preset value 2 is 50 pixel units), it indicates that the palm of the user always hovers in the shooting range of the camera in the 200 ms. In this case, the mobile phone may determine that the user inputs the preset enabling gesture.

In addition, after detecting that the user inputs the preset enabling gesture, the mobile phone may further record a current position of the palm of the user. For example, the mobile phone may use coordinates of the reference point C(n) of the palm of the user in an $N^{th}$ frame of image in FIG. 8 as the position of the palm of the user. The position may be used as a start position A1 at which the user subsequently inputs the air gesture.

Certainly, if the mobile phone determines that the quantity of images that include the pattern 801 in the N frames of images is less than the preset value 1, or the mobile phone determines that the moving distance of the palm of the user is greater than the preset value 2, it indicates that the user does not input, in the 200 ms, the enabling gesture, namely, the gesture in which the palm hovers. In this case, the Mobile phone may continue to obtain N frames of images collected by the camera in recent 200 ms, and continue to recognize, based on the method, whether the user currently inputs the preset enabling gesture.

In some other embodiments, the user may trigger, in another manner, the mobile phone to enter an air gesture operation mode. For example, the user may input, by using a voice assistant app in the mobile phone, a voice signal for enabling the air gesture. Further, after detecting the voice signal, the mobile phone may turn on the camera to start to collect the air gesture input by the user. For another example, a corresponding button (for example, a virtual button or a physical button) may be disposed or an operation (for example, a press operation or a double-tap operation) may be set in the mobile phone to enable the air gesture operation mode. After detecting that the user taps the button or performs the operation, the mobile phone may turn on the camera to start to collect the air gesture input by the user. In addition, after turning on the camera, the mobile phone may use a position, of the palm of the user, collected by the camera for the first time as the start position A1 at which the user subsequently inputs the air gesture. Alternatively, after turning on the camera, the mobile phone may detect whether the user performs a preset hover gesture. If detecting that the user performs the preset hover gesture, the mobile phone may use a position at which the user hovers as the start position A1 at which the user subsequently inputs the air gesture.

After detecting that the user inputs the preset enabling gesture, the mobile phone may perform the following steps S602 and S603 in response to the enabling gesture. It should be noted that in this embodiment of this application, a sequence of performing the following steps S602 and S603 is not limited. The mobile phone may simultaneously perform the following steps S602 and S603, may perform step S602 before step S603, or may perform step S603 before step S602.

S602. The mobile phone displays a preset indication icon on a current first display interface in response to the enabling gesture.

In step S602, after the mobile phone detects that the user inputs the preset enabling gesture, it indicates that the user wants to control, by using the air gesture, an application that currently runs in the mobile phone. To direct and prompt the user to efficiently and correctly input the air gesture, the mobile phone may display the preset indication icon at a preset position of a currently displayed interface (for example, the first display interface). A position, a length, or a shape of the indication icon on the interface may be changed.

Figure 9:
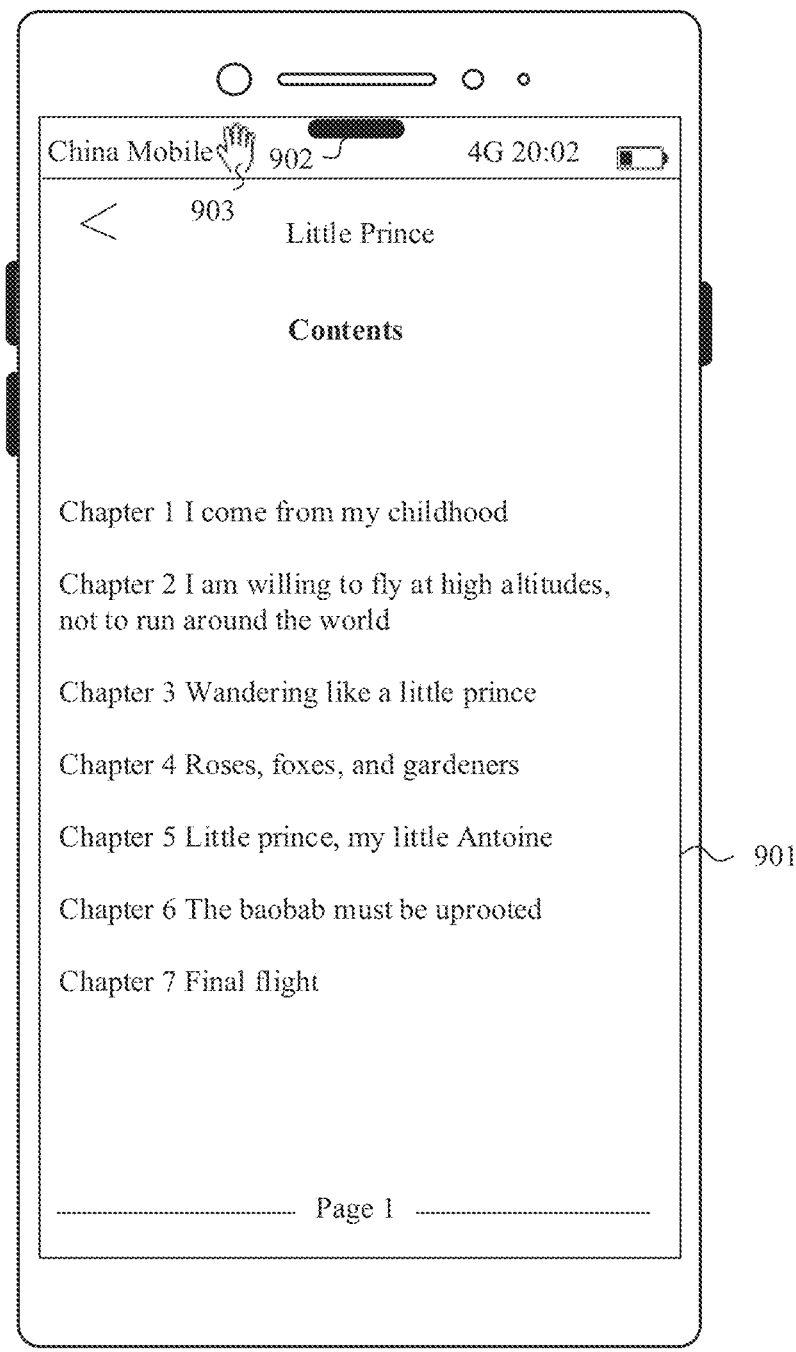
FIG. 9 is a schematic diagram 5 of an application scenario of an air gesture-based interaction method according to an embodiment of this application.

For example, an electronic book app currently runs in the mobile phone in foreground. As shown in FIG. 9, when the user inputs the enabling gesture, the mobile phone currently displays a first display interface 901 of the electronic book app. After detecting that the user inputs the enabling gesture, the mobile phone may display a first indication icon 902 on a top of a screen in a horizontal direction. After the first indication icon 902 appears on the first display interface 901, the user may learn that the mobile phone enters the air gesture operation mode, and therefore the user is indicated to start to input a corresponding air gesture.

The first indication icon 902 may be an icon such as a slider or a progress bar. The first indication icon 902 may be a linear icon or an arc-shaped icon. A display effect such as a specific shape, size, position, or color of the first indication icon 902 is not limited in this embodiment of this application.

For example, still as shown in FIG. 9, the mobile phone may display the first indication icon 902 at a middle position of a top of the first display interface 901, to prevent the first indication icon 902 from blocking content displayed on the first display interface 901. The first indication icon 902 may move in the horizontal direction (namely, a direction of the x axis), and the first indication icon 902 may be used to indicate a moving distance, in the horizontal direction, of the air gesture input by the user. That is, after the mobile phone enters the air gesture operation mode, the mobile phone may divide an air gesture subsequently input by the user into a sliding operation in the direction of the x axis, and prompt the user with an execution progress of the current air gesture in the direction of the x axis by moving the first indication icon 902.

Figure 10:
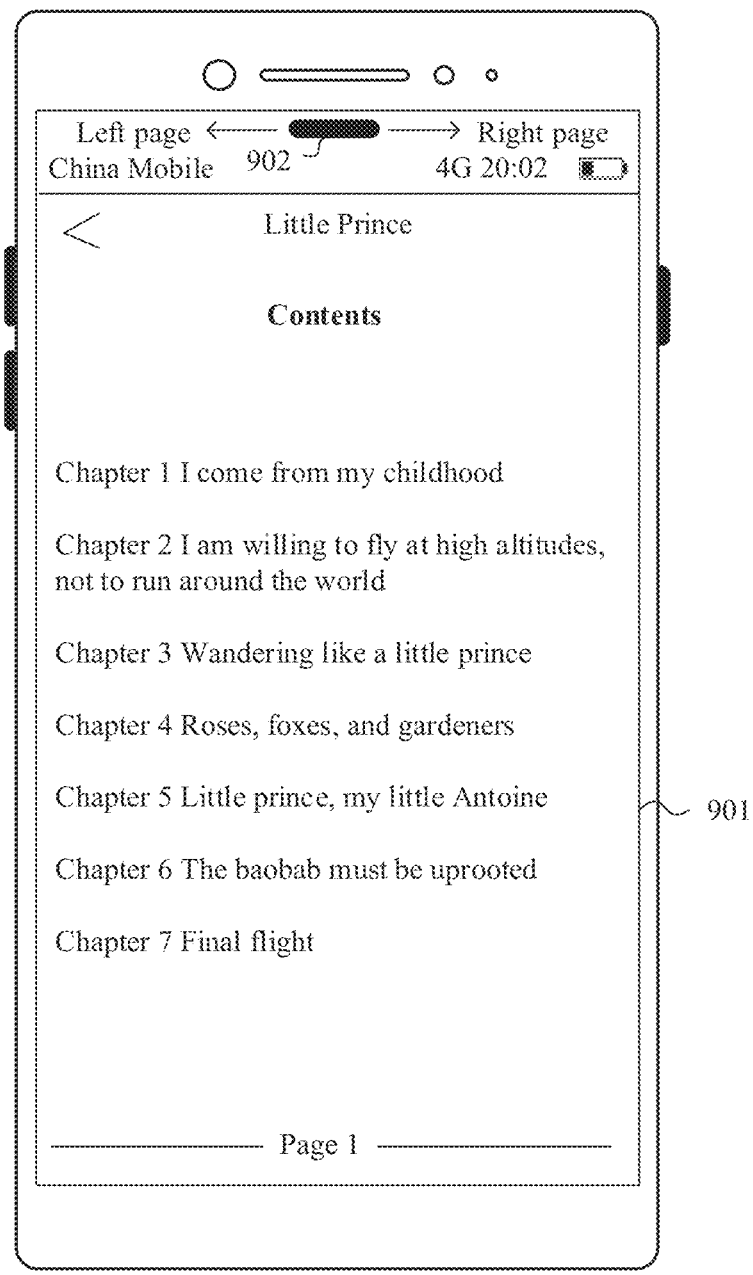
FIG. 10 is a schematic diagram 6 of an application scenario of an air gesture-based interaction method according to an embodiment of this application.

Alternatively, in addition to the first indication icon 902, the mobile phone may display indication information such as text, an arrow, or a preset icon on the first display interface 901. As shown in FIG. 10, a first arrow may be displayed on a left side of the first indication icon 902, and the user is prompted, by using text, to slide to the left to turn to a page. In addition, a second arrow may be displayed on a right side of the first indication icon 902, and the user is prompted, by using text, to slide to the right to turn to a page. In this way, the user can purposefully perform a corresponding air gesture based on the indication information. Alternatively, still as shown in FIG. 9, after detecting that the user inputs the preset enabling gesture, the mobile phone may display a preset icon 903 in a status bar, to notify the user that the mobile phone enters the air gesture operation mode and input of a corresponding air gesture can be started. Certainly, after detecting that the user inputs the enabling gesture, the mobile phone may notify, in a manner such as a voice manner, the user that the air gesture operation mode is entered, and prompt the user to input a corresponding air gesture. This is not limited in this embodiment of this application.

Figure 11:
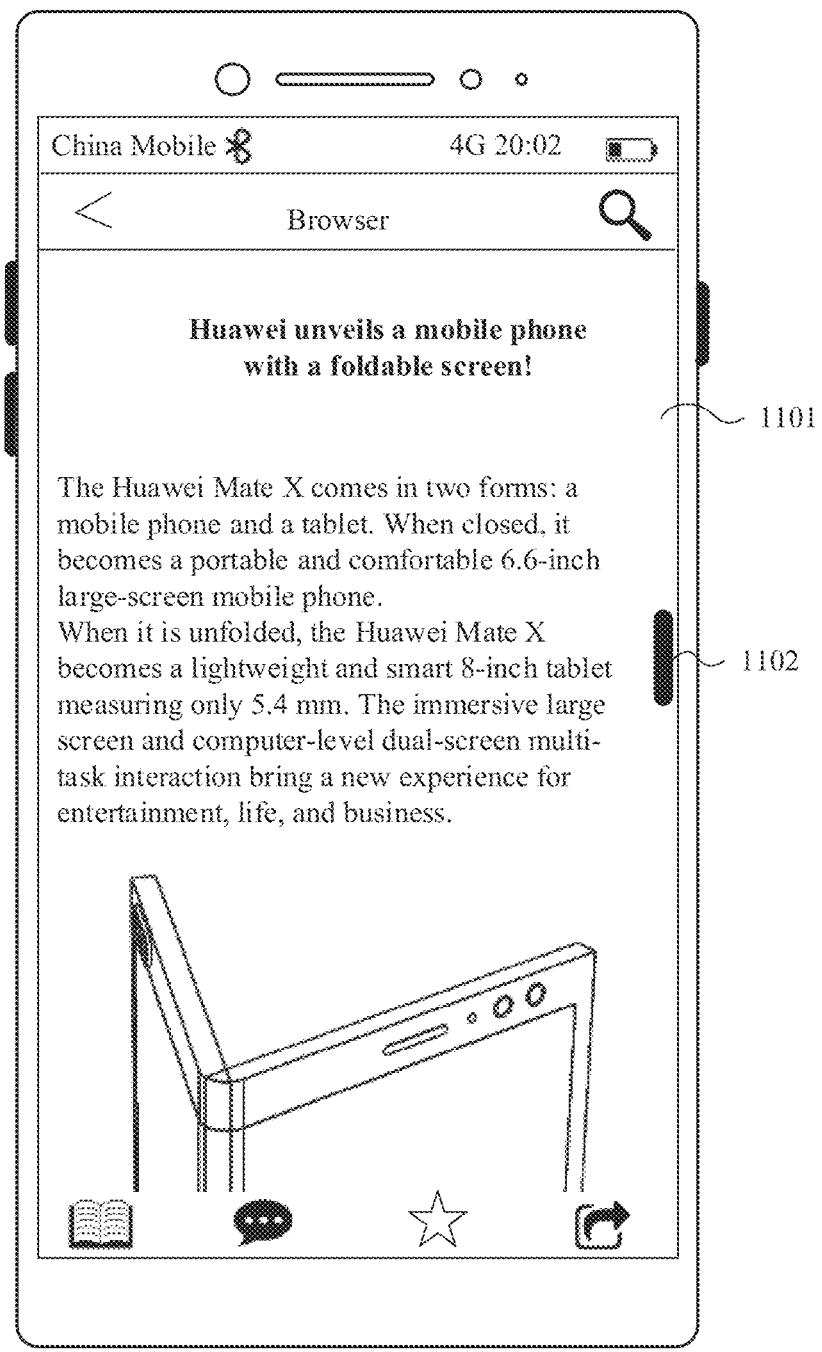
FIG. 11 is a schematic diagram 7 of an application scenario of an air gesture-based interaction method according to an embodiment of this application.

In some other embodiments, as shown in FIG. 11, when the mobile phone displays an interface 1101 of a browser app, if the mobile phone detects that the user inputs the preset enabling gesture, the mobile phone may display a second indication icon 1102 in a vertical direction (namely, a direction of the y axis). For example, the mobile phone may display the second indication icon 1102 at a middle position of a left side edge (or a right side edge) of a display. The second indication icon 1102 may move in the vertical direction (namely, the direction of the y axis), and the second indication icon 1102 may be used to indicate a moving distance, in the vertical direction, of the air gesture input by the user. That is, after the mobile phone enters the air gesture operation mode, the mobile phone may divide an air gesture subsequently input by the user into a sliding operation in the direction of the y axis, and prompt the user with an execution progress of the current air gesture in the direction of the y axis by moving the second indication icon 1102.

For example, after detecting that the user inputs the preset enabling gesture, the mobile phone may further determine, based on a type of an application that currently runs in foreground or a type of a currently displayed interface, whether the currently displayed interface (for example, the interface 1101) supports an operation of sliding upward or downward or an operation of sliding to the left or to the right. If the currently displayed interface supports the operation of sliding to the left or to the right, the mobile phone may display the first indication icon 902 on the top of the screen. If the currently displayed interface supports the operation of sliding upward or downward, the mobile phone may display the second indication icon 1102 on a side edge of the screen. If the currently displayed interface supports both the operation of sliding upward or downward and the operation of sliding to the left or to the right, the mobile phone may display both the first indication icon 902 and the second indication icon 1102. This is not limited in this embodiment of this application.

Alternatively, after detecting that the user inputs the enabling gesture, the mobile phone may display the indication icon (for example, the first indicator icon 902 shown in FIG. 9) at the preset position (for example, a central position of the top of the screen) of the current first display interface by default. If subsequently detecting that the user inputs an air gesture of sliding upward or downward, the mobile phone may display the indication icon (for example, the second indication icon 1102 shown in FIG. 11) on the side edge of the screen, and move the second indication icon 1102 in response to the air gesture.

Figure 12:
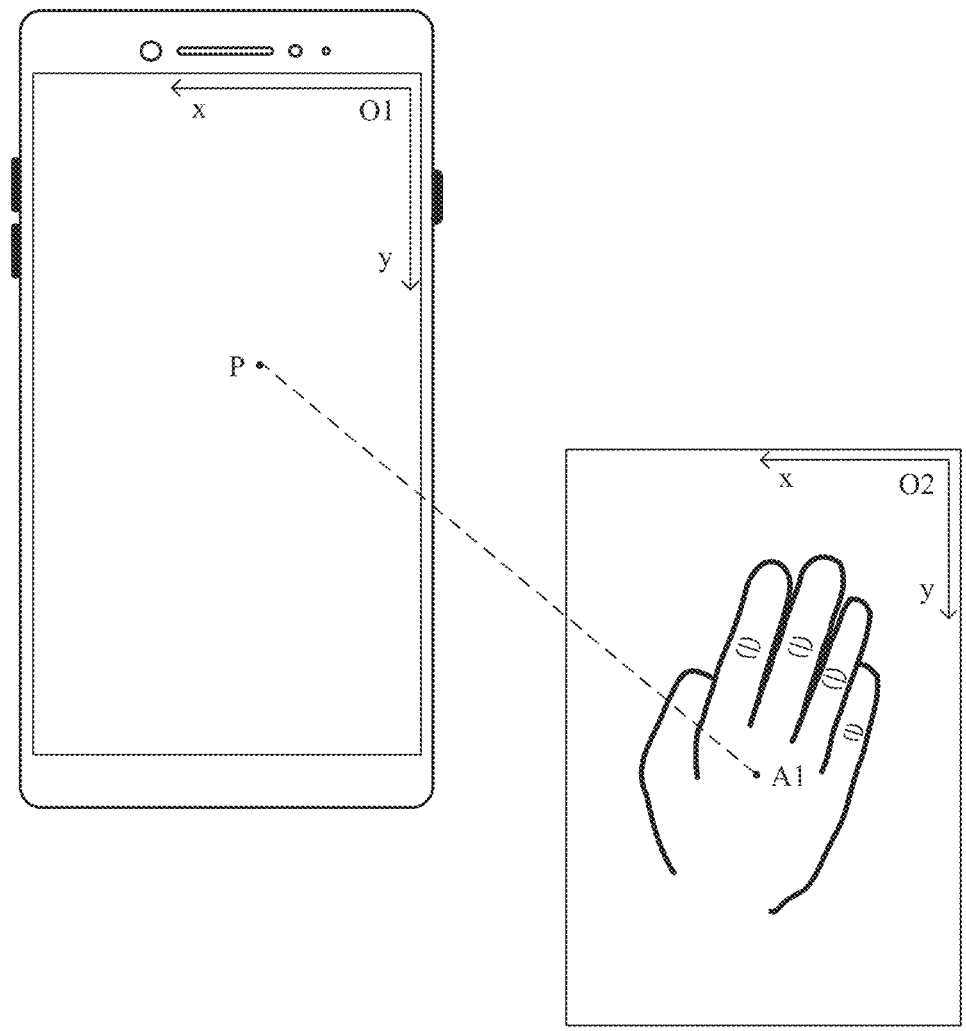
FIG. 12 is a schematic diagram 8 of an application scenario of an air gesture-based interaction method according to an embodiment of this application.

In some other embodiments, as shown in FIG. 12, a correspondence between each position on the display and each position on each frame of image collected by the camera may be established in advance in the mobile phone. For example, an upper right corner of the display of the mobile phone may be used as an origin O1, and a first coordinate system may be established by using O1 as an origin. Similarly, an upper right corner of each frame of image captured by the camera may be used as an origin O2, and a second coordinate system may be established by using O2 as an origin. There is a mapping relationship between each coordinate point in the first coordinate system and each coordinate point in the second coordinate system.

Figure 13:
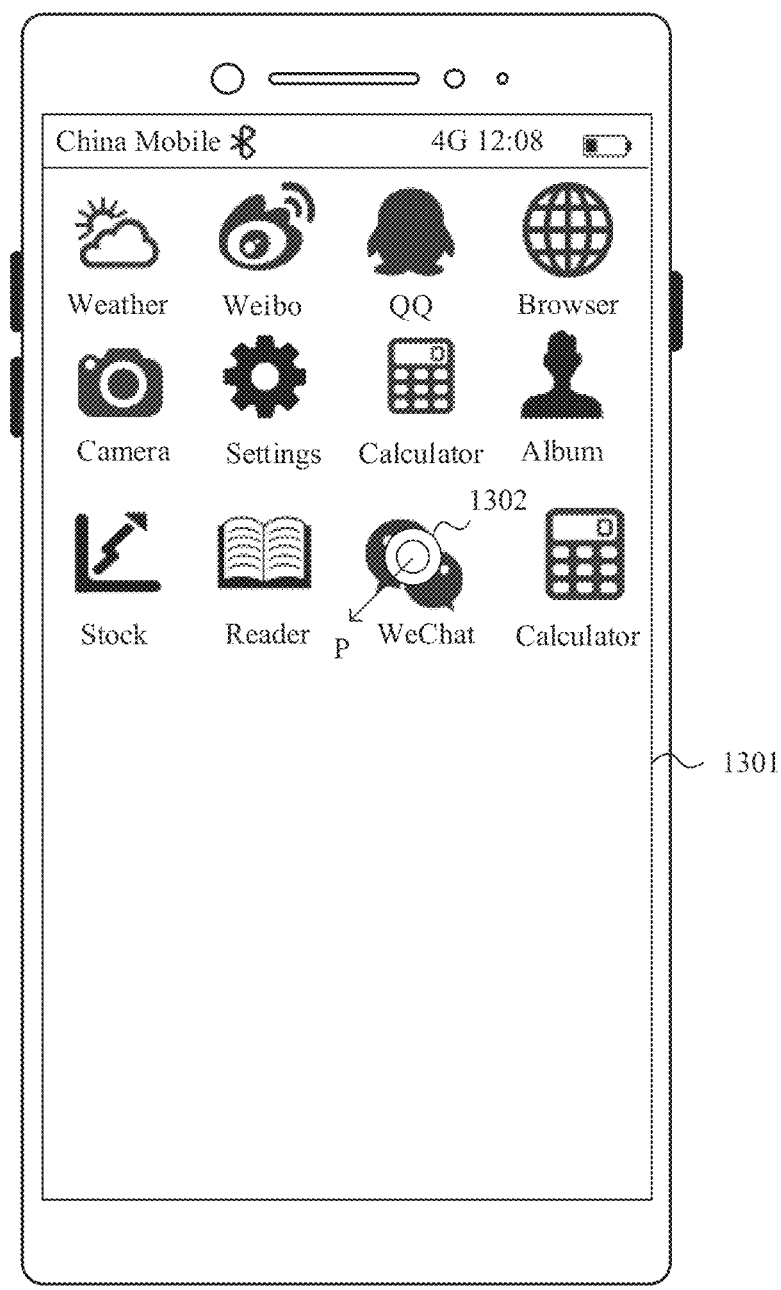
FIG. 13 is a schematic diagram 9 of an application scenario of an air gesture-based interaction method according to an embodiment of this application.

When the mobile phone detects the enabling gesture input by the user, the mobile phone may determine, as a start position at which the user inputs the air gesture, a position (namely, a point A1), of the palm of the user, collected when the enabling gesture ends. Then, the mobile phone may determine, in the first coordinate system, a point B corresponding to the start position, namely, the point A1. That is, the current position of the palm of the user corresponds to the point B on the display. In this case, as shown in FIG. 13, for example, the mobile phone currently displays a desktop 1301. The mobile phone may display a third indication icon 1302 at the point B on the desktop 1301, to prompt the user with information indicating that the current position of the palm of the user corresponds to a point P on the desktop 1301. The third indication icon 1302 may move on the desktop 1301 with the air gesture input by the user.

It may be learned that in this embodiment of this application, when the mobile phone enters the air gesture operation mode, the mobile phone may display the preset indication icon on the current display interface, to prompt the user to start to input the air gesture. Subsequently, the mobile phone may further prompt the user with an execution progress of the air gesture by moving the indication icon. Therefore, user experience is improved when the user interacts with the mobile phone by using the air gesture.

S603. In response to the enabling gesture, the mobile phone starts to detect, by using the camera, a first air gesture input by the user.

In step S603, after the mobile phone detects that the user inputs the preset enabling gesture, it indicates that the user wants to control, by using the air gesture, an application that currently runs in the mobile phone, and the mobile phone enters the air gesture operation mode. In this case, the mobile phone may continue to collect each frame of image in real time by using the camera, and the Mobile phone may recognize, based on the collected image, a specific air gesture input by the user.

For example, after detecting that the user inputs the preset enabling gesture, the mobile phone may use, as the start position A1, the position, of the palm of the user, collected when the enabling gesture ends, and then determine, in real time based on M frames of recently collected images, the first air gesture input by the user.

Figure 14:
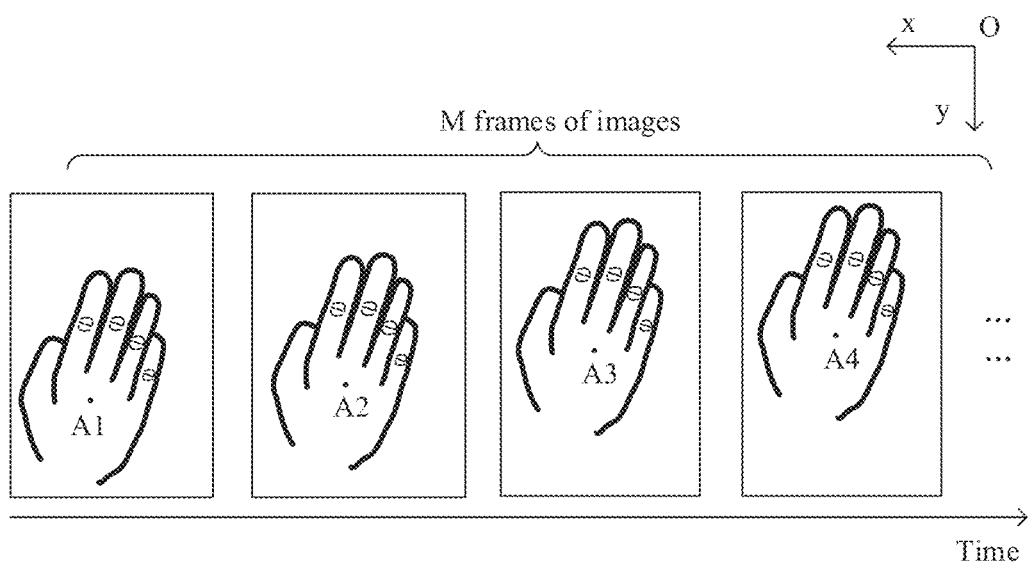
FIG. 14 is a schematic diagram 10 of an application scenario of an air gesture-based interaction method according to an embodiment of this application.

For example, as shown in FIG. 14, after the mobile phone enters the air gesture operation mode, each time the mobile phone obtains a frame of image, the mobile phone may recognize the pattern of the palm of the user in the image. Then, the mobile phone may determine a position of the palm of the user in the image. For example, the mobile phone may use coordinates of a central point A(m) of the palm of the user as the position of the palm of the user in each frame of image. In this way, starting from coordinates of the start position A1, the mobile phone may calculate a moving distance S1 of the palm of the user in the x axis and a moving distance S2 of the palm of the user in the y axis based on the coordinates of the central point A(m) in each frame of image.

In addition, if the camera of the mobile phone is a 3D camera, the start position A of the palm of the user further includes a distance of the palm of the user in a z axis (namely, a direction perpendicular to the screen of the mobile phone), that is, A1=(X1, Y1, Z1). In addition, the position (namely, the central point A(m)) of the palm of the user in each frame of image collected by the mobile phone includes a distance in the z axis, that is, A(m)=(X(m), Y(m), Z(m)). In this case, in addition to the moving distance S1 of the palm of the user in the x axis and the moving distance S2 of the palm of the user in the y axis, the mobile phone may calculate a moving distance S3 of the palm of the user in the z axis.

That is, the mobile phone may divide the first air gesture currently input by the user into gesture operations in three directions, namely, the x axis, the y axis, and the z axis.

For example, when a moving distance S1 of the palm of the user in a positive direction of the x axis is greater than a threshold 1, it indicates that the first air gesture input by the user currently moves to the left. When a moving distance S1 of the palm of the user in a negative direction of the x axis is greater than the threshold 1, it indicates that the first air gesture input by the user currently moves to the right. When a moving distance S2 of the palm of the user in a positive direction of the y axis is greater than a threshold 2, it indicates that the first air gesture input by the user currently moves downward. When a moving distance S2 of the palm of the user in a negative direction of the y axis is greater than the threshold 2, it indicates that the first air gesture input by the user currently moves upward. When the moving distance S3 of the palm of the user in the direction of the z axis is greater than a threshold 3, it indicates that the first air gesture input by the user is a press operation.

Alternatively, there is a continuous process of inputting the first air gesture, and therefore the mobile phone may set a corresponding step length in each of the x axis, the y axis, and the z axis. For example, the mobile phone sets a step length of 50 pixel units in the x axis. In this case, the mobile phone may detect the moving distance S1 of the palm of the user in the positive direction of the x axis in real time by using the start position A1 of the palm of the user as a start point and based on M frames of recently obtained images.

Each time it is detected that the moving distance S1 of the palm of the user in the positive direction of the x axis is increased by 50 pixel units, it indicates that the first air gesture currently input by the user moves to the left by a specific distance. In this case, the mobile phone may report a sliding event of sliding to the left to a system UI at an application layer, so that the mobile phone may perform the following step S604 in response to the sliding event.

In addition, each time it is detected that the moving distance S1 of the palm of the user in the positive direction of the x axis is increased by 50 pixel units, the mobile phone may further report a sliding event of sliding to the left to an application (for example, the electronic book app) that currently runs in foreground and that is at the application layer, so that the mobile phone may perform the following step S605 in response to the sliding event.

That is, in response to the first air gesture, the mobile phone may perform the following step S604 and S605 based on detected moving distances of the first air gesture in the three directions, namely, the x axis, the y axis, and the z axis. It should be noted that in this embodiment of this application, a sequence of performing the following step S604 and S605 is not limited. The mobile phone may simultaneously perform the following step S604 and S605, may perform step S604 before step S605, or may perform step S605 before step S604.

S604. In response to the first air gesture, the mobile phone moves the indication icon based on a moving trajectory of the first air gesture.

S605. In response to the first air gesture, the mobile phone displays a second display interface corresponding to the first air gesture.

Figure 15:
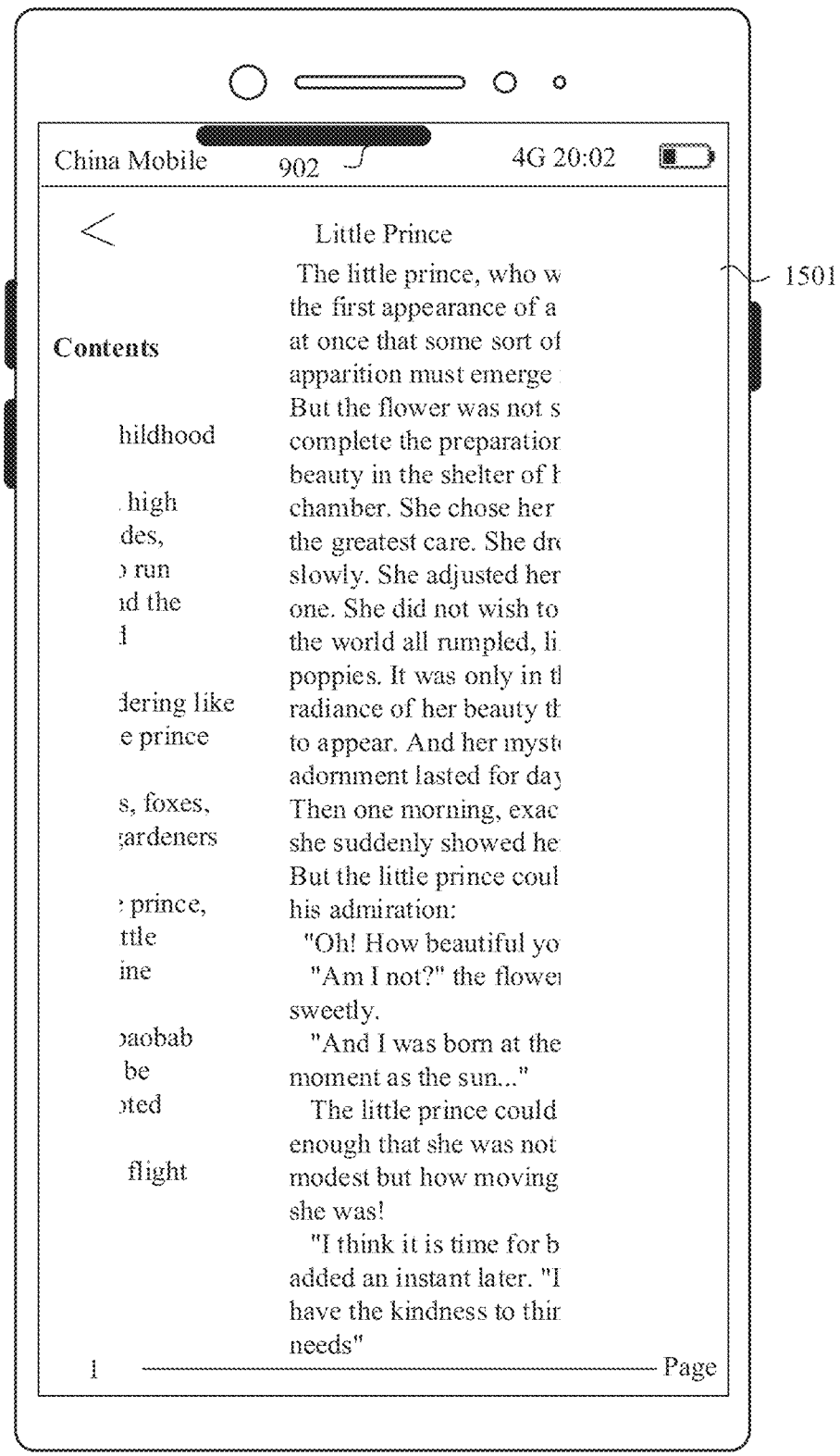
FIG. 15 is a schematic diagram 11 of an application scenario of an air gesture-based interaction method according to an embodiment of this application.

The first indication icon 902 shown in FIG. 9 is used as an example. In step S604, if it is detected that a moving distance S1 of the first air gesture in the positive direction of the x axis is greater than a corresponding step length, as shown in FIG. 15, the mobile phone may extend the first indication icon 902 in the positive direction of the x axis (that is, extend the first indication icon 902 to the left). In this way, when inputting the first air gesture, the user may synchronously learn of the moving trajectory of the first air gesture on the display interface by using the first indication icon 902.

For example, the mobile phone may calculate, based on the moving distance S1 of the first air gesture in the positive direction of the x axis and a specific proportionality coefficient k (k>0), a distance L1 by which the mobile phone extends the first indication icon 902 to the left.

For example, it may be preset that a relationship between the distance L1 and each of the moving distance S1 and the proportionality coefficient k is as follows: L1=S1*k. In this case, when detecting that the moving distance S1 of the first air gesture in the x axis is increased or decreased, the mobile phone may calculate, based on the proportionality coefficient k, the distance L1 by which the first indication icon 902 needs to be moved, to dynamically extend the first indication icon 902 to the left or to the right.

In addition, a value of the proportionality coefficient k may be directly proportional to a distance R between the user and the mobile phone. For example, the mobile phone may detect the distance R between the user and the mobile phone by using the 3D camera. Then, the mobile phone may dynamically determine the proportionality coefficient k based on the distance R between the user and the mobile phone. When there is a longer distance R between the user and the mobile phone, a larger value may be set for the corresponding proportionality coefficient k. When there is a shorter distance R between the user and the mobile phone, a smaller value may be set for the corresponding proportionality coefficient k.

In addition, if it is detected that the moving distance S1 of the first air gesture in the positive direction of the x axis is greater than the corresponding step length, in step S605, the mobile phone may further report a sliding event to the electronic book app that currently runs. The sliding event may include parameters such as a sliding direction and the moving distance S1. Still as shown in FIG. 15, the electronic book app may perform a page turning operation in response to the sliding event. In this case, the mobile phone may display a second display interface 1501 corresponding to the moving distance S1. A part of content displayed on the first display interface 901 displayed before the first air gesture is input may be displayed on the second display interface 1501. In this way, when the user inputs the first air gesture, the mobile phone may control, in response to the first air gesture, a related application to implement a corresponding function, to implement operation experience in which the mobile phone performs air interaction with the user.

Figure 16:
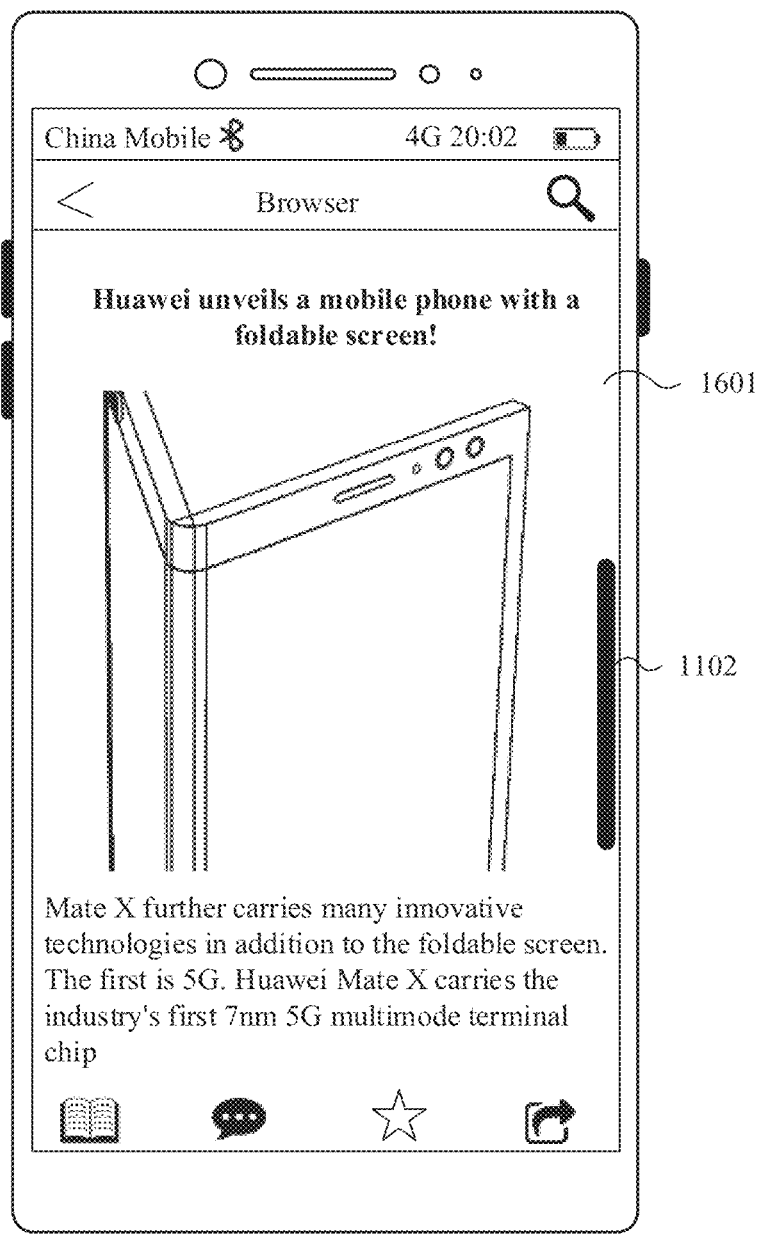
FIG. 16 is a schematic diagram 12 of an application scenario of an air gesture-based interaction method according to an embodiment of this application.

The second indication icon 1102 shown in FIG. 11 is used as an example. In step S604, if it is detected that a moving distance S2 of the first air gesture in the positive direction of the y axis is greater than a corresponding step length, as shown in FIG. 16, the mobile phone may extend the second indication icon 1102 downward based on a specific proportion. In this way, when inputting the first air gesture, the user may synchronously learn of the moving trajectory and an execution progress of the first air gesture on the display interface by using the second indication icon 1102.

In addition, in step S605, the mobile phone may further report a sliding event to the browser app that currently runs. The sliding event may include parameters such as a sliding direction and the moving distance S2. Still as shown in FIG. 16, the browser app may perform a page turning operation in response to the sliding event. In this case, the mobile phone may display a display interface 1601 corresponding to the moving distance S2, so that the mobile phone can complete a corresponding function in response to the first air gesture currently input by the user.

In addition, in FIG. 16, the browser app is used as an example to describe a process of responding, by the mobile phone, to an air gesture of sliding upward or downward when the user inputs the air gesture. It may be understood that the browser app may be an application that supports an operation of sliding upward or downward, for example, a video app. A TikTok app is used as an example. When the mobile phone plays a short video A in the TikTok app, if detecting that the user inputs a preset operation in which the palm hovers for 200 ms, the mobile phone may display a preset indication icon on a first display interface of the short video A, to prompt the user with information indicating that the air gesture operation mode is entered. For example, the mobile phone may display the indication icon on a top of the first display interface. Subsequently, if detecting, by using the camera, that the user inputs an air gesture of sliding upward, the mobile phone may display the indication icon on a side edge of the first display interface based on a moving distance of the air gesture in the y axis, and move the indication icon along the y axis, to prompt the user with an execution progress of the current air gesture in the y axis. In addition, the TikTok app may display a second display interface of a short video B in response to the air gesture, to respond to the air gesture that is of sliding upward and that is input by the user.

Figure 17:
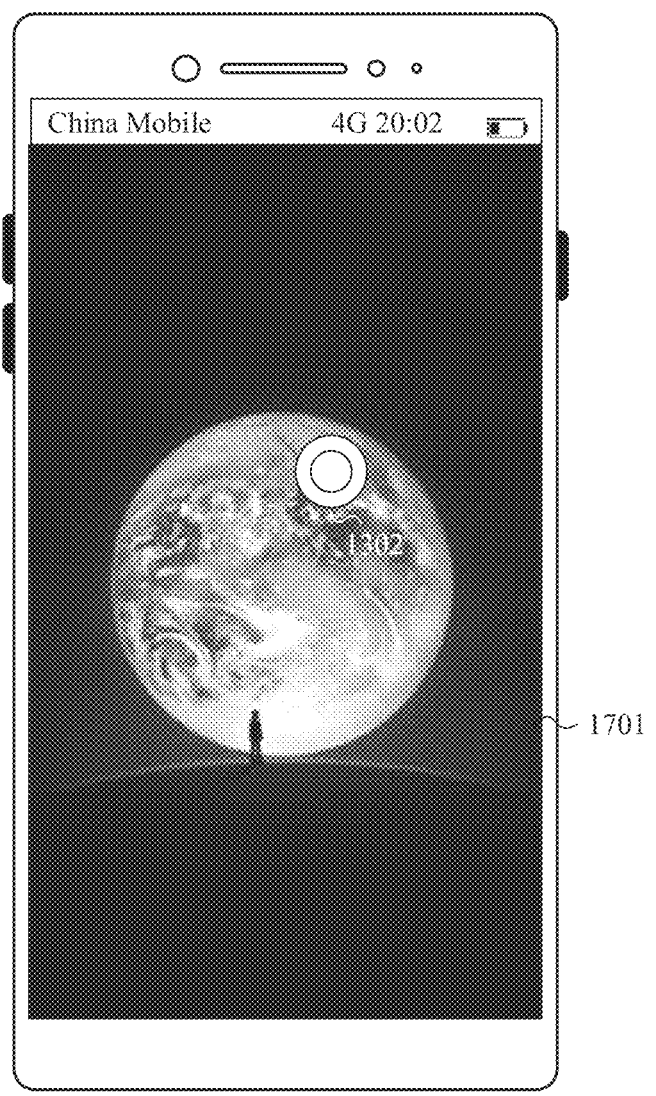
FIG. 17 is a schematic diagram 13 of an application scenario of an air gesture-based interaction method according to an embodiment of this application.

The third indication icon 1302 shown in FIG. 13 is used as an example. In step S604, if it is detected that a moving distance S3 of the first air gesture in the direction of the z axis is greater than a threshold 3, it indicates that the user wants to press the screen. In this case, as shown in FIG. 17, the mobile phone may enlarge the third indication icon 1302 based on a specific proportion. In this way, when inputting the first air gesture, the user may synchronously learn of the moving trajectory and an execution progress of the first air gesture on the display interface by using the third indication icon 1302.

In addition, in step S605, the mobile phone may further report a press event to a desktop app that currently runs. The press event may include position coordinates, namely, the point B, of the third indication icon 1302. Still as shown in FIG. 17, the browser app may open a WeChat app corresponding to the point B in response to the press event. In this case, the mobile phone may display a display interface 1701 of the WeChat app, so that the mobile phone can complete a corresponding function in response to the first air gesture currently input by the user.

In the foregoing embodiment, description is provided by using an example in which a display effect is extending the indication icon (for example, the first indication icon 902 and the second indication icon 1102) and enlarging the indication icon (for example, the third indication icon 1302). It may be understood that a person skilled in the art may set, based on actual experience or an actual application scenario, the display effect, of the indication icon, that is used for responding to the air gesture input by the user. For example, the mobile phone may feed back an execution progress of the air gesture to the user on the display interface by sliding the first indication icon 902 and the second indication icon 1102. This is not limited in this embodiment of this application.

S606. When the first air gesture ends, the mobile phone restores the indication icon at the preset position.

Figure 18:
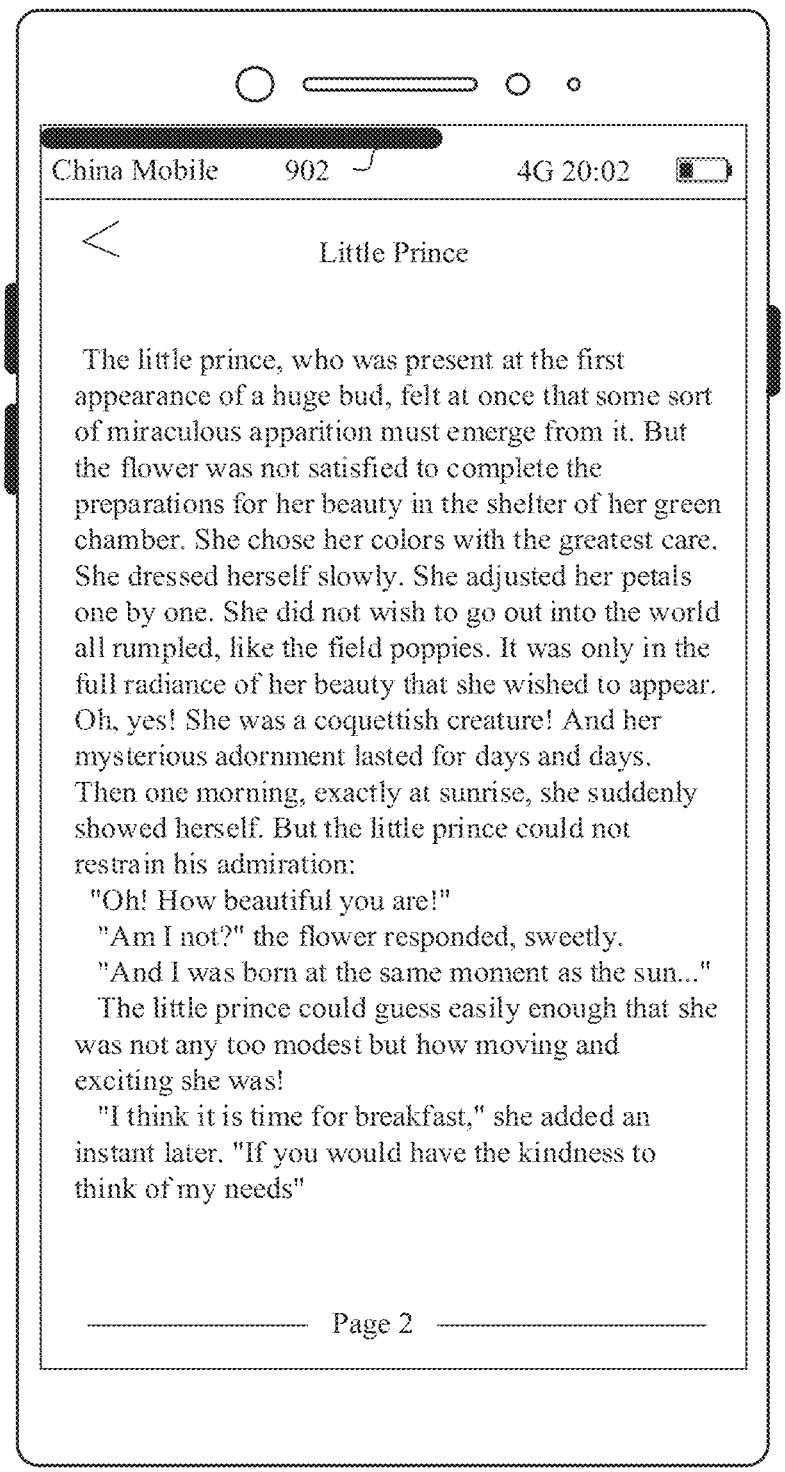
FIG. 18 is a schematic diagram 14 of an application scenario of an air gesture-based interaction method according to an embodiment of this application.

The first indication icon 902 shown in FIG. 9 and FIG. 15 is still used as an example. In the process of inputting the first air gesture by the user, the mobile phone may calculate the moving distance S1 of the first air gesture in the x axis in real time based on the foregoing method, and then move the first indication icon 902 to the left (or to the right) in real time based on the moving distance S1. As shown in FIG. 18, when the first indication icon 902 moves to a preset end position, for example, a leftmost side or a rightmost side of the screen, it indicates that the first air gesture currently input by the user ends. In this case, as shown in FIG. 18, the electronic book app turns to a previous page (or a next page) in response to the first air gesture. Alternatively, when it is detected that the moving distance S1 of the first air gesture in the x axis is greater than a preset threshold (for example, 500 pixel units), it indicates that the first air gesture currently input by the user ends. In this case, the electronic book app turns to a previous page (or a next page).

Alternatively, in the process of inputting the first air gesture by the user, if the mobile phone does not detect a related pattern of the palm of the user in a plurality of recent consecutive frames of images, it indicates that the first air gesture input by the user is beyond the shooting range of the camera. In this case, the mobile phone may determine that the first air gesture currently input by the user ends.

Alternatively, in the process of inputting the first air gesture by the user, if the mobile phone detects that the position of the palm of the user does not change significantly in a plurality of recent consecutive frames of images, it indicates that there is a pause in inputting the air gesture by the user. In this case, the mobile phone may determine that the first air gesture currently input by the user ends.

Figure 19:
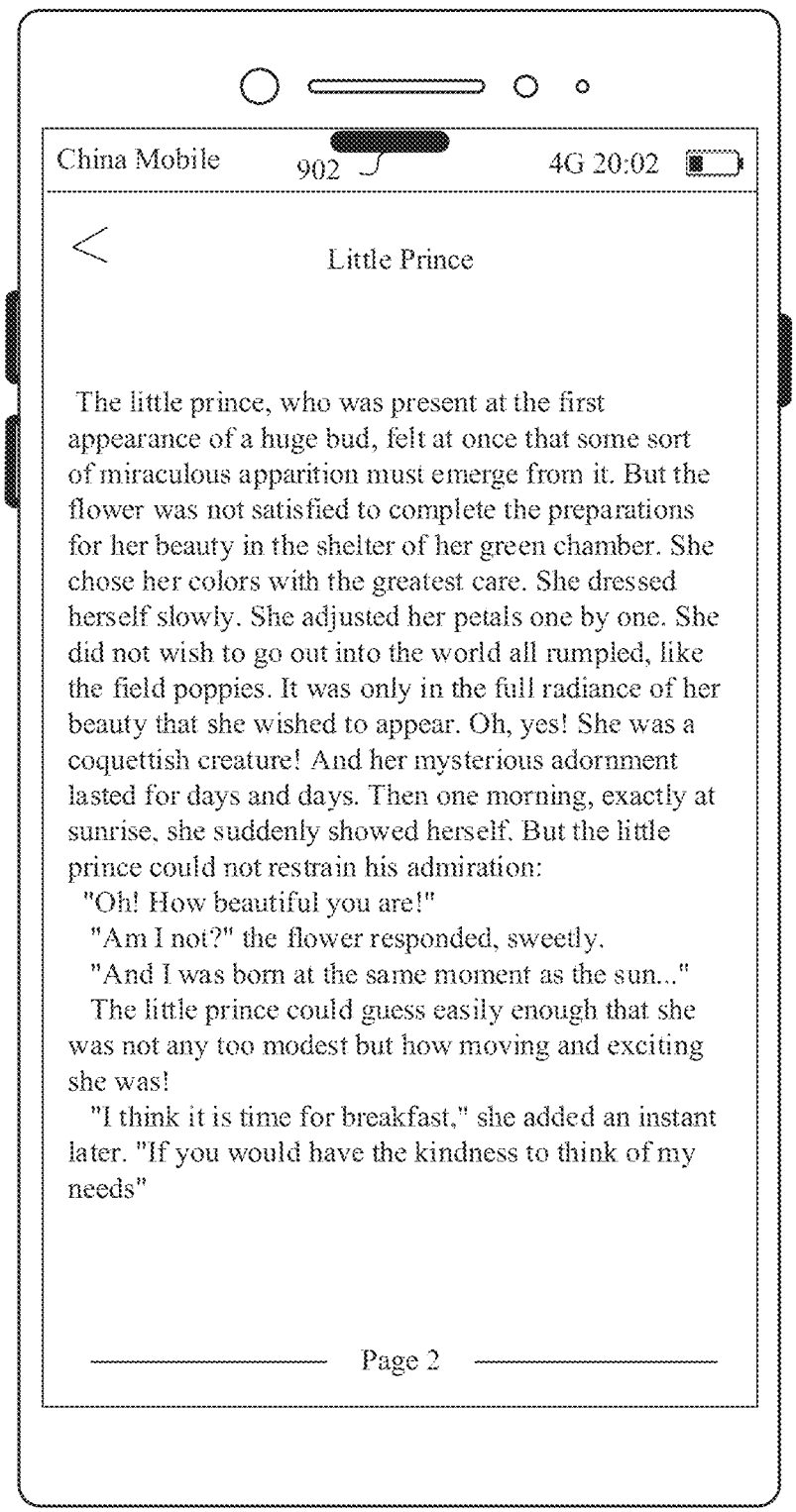
FIG. 19 is a schematic diagram 15 of an application scenario of an air gesture-based interaction method according to an embodiment of this application.

After the first air gesture ends, the first indication icon 902 is still used as an example. As shown in FIG. 19, the mobile phone may restore the first indication icon 902 at the preset position at which the first indication icon 902 appears on the first display interface, for example, the middle position of the top of the screen, to prompt the user with information indicating that the current first air gesture ends, and the mobile phone responds to the first air gesture.

S607. The mobile phone continues to detect, by using the camera, a second air gesture input by the user.

After the first air gesture ends, the mobile phone may further continue to collect, by using the camera, the second air gesture input by the user. Usually, a backhaul operation of the first air gesture is generated between processes of performing the first air gesture and the second air gesture. The backhaul operation is a gesture backhaul operation that is performed after the user performs the first air gesture and that is performed in a direction opposite to a direction in which the first air gesture moves.

Figure 20:
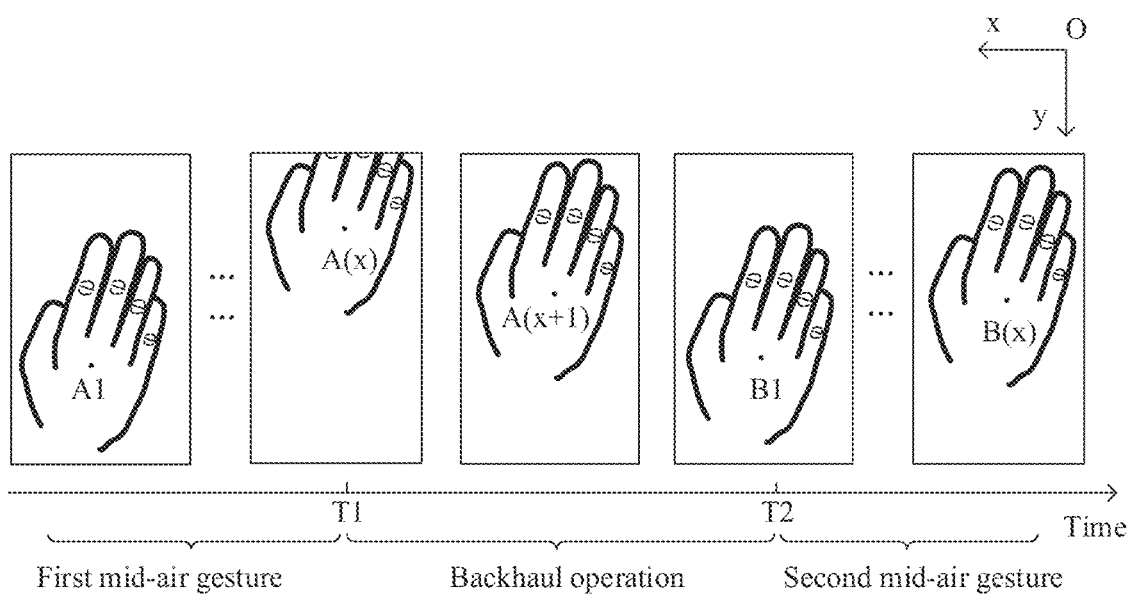
FIG. 20 is a schematic diagram 16 of an application scenario of an air gesture-based interaction method according to an embodiment of this application.

For example, the first air gesture is an operation of sliding the palm upward by the user, and the second air gesture is also an operation of sliding the palm upward by the user. As shown in FIG. 20, the palm of the user moves in the negative direction of the y axis in a plurality of frames of images of the first air gesture that are collected by the mobile phone, and before the user starts to perform the second air gesture, the palm needs to be first retracted in the positive direction of the y axis, and therefore the backhaul operation is generated. Then, the palm is slid upward for the second time to perform the second air gesture in the negative direction of the y axis.

In this case, after the first air gesture ends, the mobile phone may detect, in real time based on a collected image, the backhaul operation performed by the user. For example, after the first air gesture ends at a moment T1, it indicates that the user starts to perform the backhaul operation of the first air gesture. When the mobile phone detects that a moving direction of the palm of the user changes from the positive direction of the y axis to the negative direction of the y axis (that is, when it is at a moment T2), it indicates that the current backhaul operation ends. To prevent the mobile phone from being interfered with the current backhaul operation in recognizing the second air gesture, the mobile phone may discard an image collected from the moment T1 to the moment T2.

In addition, the mobile phone may use a position of the palm of the user in an image collected at the moment T2 as a start position (for example, the start position is B1) of the second air gesture, and recognize, in real time based on the collected image, the second air gesture input by the user. For example, the mobile phone may calculate moving distances of the palm of the user in the second air gesture in the three directions, namely, the x axis, the y axis, and the z axis, by using coordinates of the start position B1 as a start point, to recognize the second air gesture input by the user.

A specific method for recognizing, by the mobile phone, the second air gesture input by the user is similar to a specific method, in step S603, for recognizing, by the mobile phone, the first air gesture input by the user. Therefore, details are not described herein.

S608. In response to the second air gesture, the mobile phone moves the indication icon based on a moving trajectory of the second air gesture.

S609. In response to the second air gesture, the mobile phone displays a display interface corresponding to the second air gesture.

This is similar to step S604 and S605. When the mobile phone detects the second air gesture input by the user, the mobile phone may report a corresponding event (for example, a sliding event or a press event) to the system UI, so that the system UI controls, in response to the event, the indication icon (for example, the first indication icon 902, the second indication icon 1102, or the third indication icon 1302) on the current display interface to move based on the moving trajectory of the second air gesture. In addition, the mobile phone may report a corresponding event (for example, a page turning event or a going back event) to the application that currently runs in foreground, so that the related application can implement a corresponding application function in response to the event.

In addition, after it is detected that the second air gesture ends, the mobile phone may restore the indication icon on the current display interface at the start position again, which is similar to step S606. Subsequently, the mobile phone may further continue to recognize and respond, based on the foregoing method, to a third air gesture, a fourth air gesture, and the like that are input by the user.

In this way, after the mobile phone enters the air gesture operation mode, the mobile phone may continuously recognize and respond to a plurality of air gestures continuously performed by the user, and feed back an execution progress of each input air gesture to the user on the display interface by using the indication icon. Therefore, user experience is improved when the user interacts with the mobile phone by using the air gesture.

In some embodiments, the mobile phone may start a preset timer after detecting that the user inputs the enabling gesture. A timer 1 in which 10 s is set is used as an example. After detecting that the user inputs the enabling gesture, namely, the gesture in which the palm hovers for 200 ms, the mobile phone may start the timer 1. Within 10 s in which the timer 1 does not expire, the mobile phone may continuously recognize and respond, based on the method in the foregoing embodiment, to a plurality of air gestures continuously performed by the user, and feed back an execution progress of each input air gesture to the user on the display interface by using the indication icon.

After the timer 1 expires, the mobile phone may automatically exit the air gesture operation mode, and no longer continues to recognize and respond, based on an image collected by the camera, to the air gesture performed by the user. In this case, if the user wants to continue to interact with the mobile phone by using the air gesture, the user may input the preset enabling gesture to the mobile phone again. In this case, the mobile phone may continue to perform, starting from step S601, the air gesture-based interaction method provided in this embodiment of this application. In addition, after the timer 1 expires, the mobile phone may hide the originally displayed indication icon on the current display interface, to prompt the user with information indicating that the mobile phone exits the air gesture operation mode.

Alternatively, when the user no longer wants to interact with the mobile phone by using the air gesture, the user may input, to the camera, an end gesture preset for exiting the air gesture mode. For example, the end gesture may be a gesture in which the user clenches a fist and hovers for 200 ms.

Figure 21A:
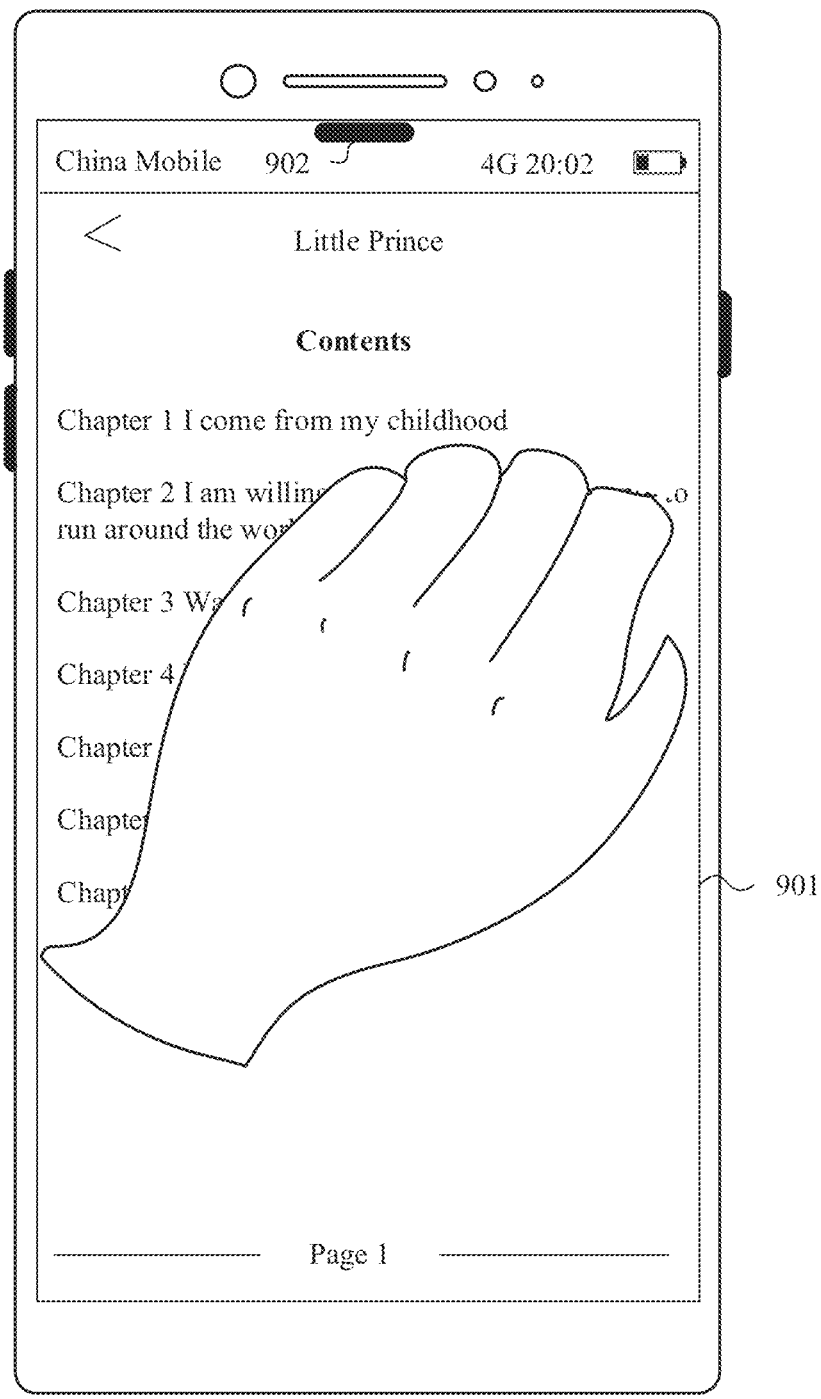
FIG. 21(a) and FIG. 21(b) are a schematic diagram 17 of an application scenario of an air gesture-based interaction method according to an embodiment of this application.
Figure 21B:
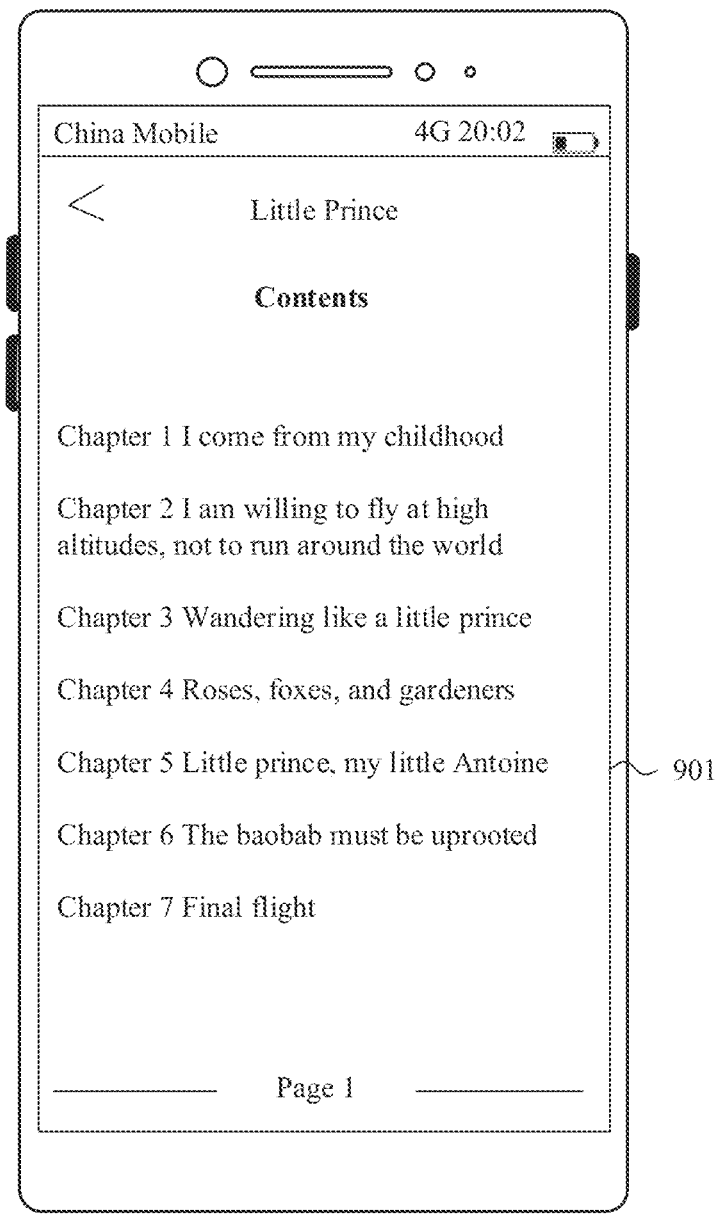

As shown in FIG. 21($a$), if the mobile phone detects that an image collected in recent 200 ms includes a pattern of clenching the fist by the user, and a position at which the user clenches the fist does not change significantly in the image, the mobile phone may determine that the user inputs the preset end gesture. In this case, in response to the end gesture, as shown in FIG. 21($b$), the mobile phone may hide the indication icon (for example, the first indication icon 902) on the current display interface 901, to prompt the user with information indicating that the air gesture operation mode is exited.

The embodiments of this application disclose an electronic device, including a processor, and a memory, an input device, and an output device that are connected to the processor. The input device and the output device may be integrated into a device. For example, a touch sensor may be used as the input device, a display may be used as the output device, and the touch sensor and the display may be integrated into a touchscreen.

Figure 22:
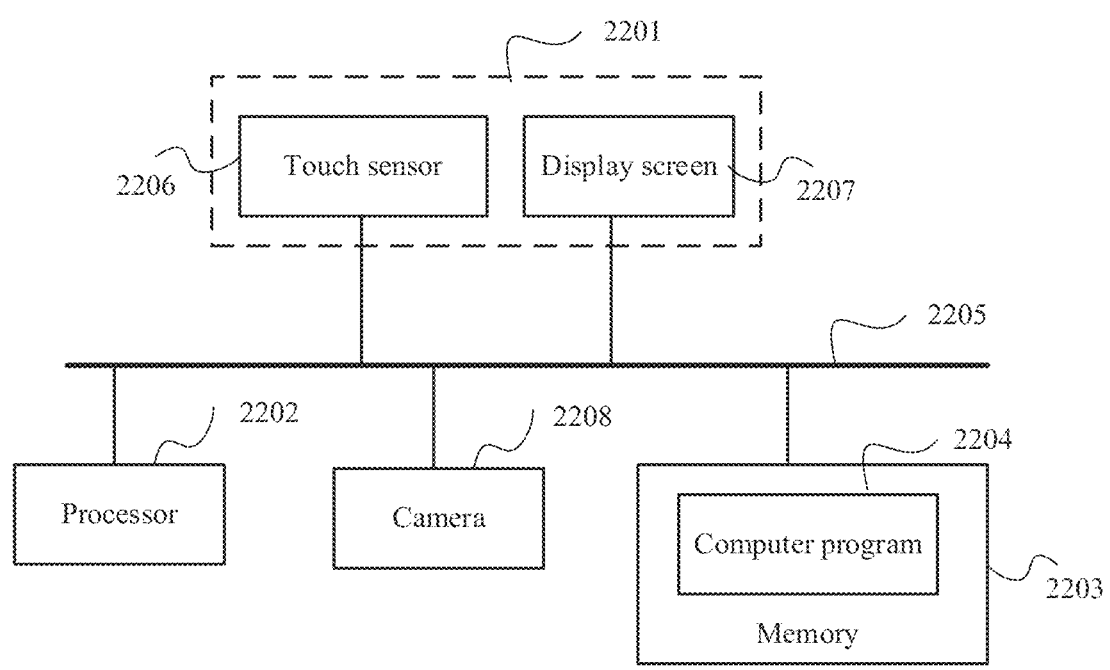
FIG. 22 is a second schematic diagram of a structure of an electronic device according to an embodiment of this application.

In this case, as shown in FIG. 22, the electronic device may include a touchscreen 2201, where the touchscreen 2201 includes a touch sensor 2206 and a display 2207, one or more processors 2202, one or more cameras 2208, a memory 2203, one or more applications (not shown), and one or more computer programs 2204. The components may be connected by using one or more communication buses 2205. The one or more computer programs 2204 are stored in the memory 2203 and are executed by the one or more processors 2202. The one or more computer programs 2204 include instructions, and the instructions may be used to perform the steps in the foregoing embodiments. All related content of the steps in the foregoing method embodiments may be cited in function descriptions of corresponding physical devices. Details are not described herein again.

For example, the processor 2202 may be specifically the processor 110 shown in FIG. 1, the memory 2203 may be specifically the internal memory 121 shown in FIG. 1, the camera 2208 may be specifically the camera 193 shown in FIG. 1, the display 2207 may be specifically the display 194 shown in FIG. 1, and the touch sensor 2206 may be specifically a touch sensor in the sensor module 180 shown in FIG. 1. This is not limited in this embodiment of this application.

The foregoing descriptions about the implementations allow a person skilled in the art to clearly understand that, for a purpose of convenient and brief description, division into the foregoing functional modules is used as an example for illustration. In actual application, the foregoing functions can be allocated to different functional modules and implemented based on a requirement, that is, an inner structure of an apparatus is divided into different functional modules to implement all or some of the functions described above. For detailed working processes of the foregoing system, apparatus, and unit, refer to corresponding processes in the foregoing method embodiments. Details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory a magnetic disk, or an optical disc.

The foregoing descriptions are merely specific implementations of the embodiments in this application, but are not intended to limit the protection scope of the embodiments in this application. Any variation or replacement within the technical scope disclosed in the embodiments in this application shall fall within the protection scope of the embodiments in this application. Therefore, the protection scope of the embodiments of this application shall be subject to the protection scope of the claims.

What is claimed is:

1. A method, comprising:
    displaying a first display interface of a first application;
    detecting a first air gesture from a user;
    in response to detecting the first air gesture from the user:
        displaying a first indication icon on a top or a bottom of the first display interface for sliding left or right;
        moving the first indication icon in a first preset direction on the first display interface along a first moving trajectory of the first air gesture; and
        sliding the first display interface of the first application to turn to a first page;
    displaying a second display interface of a second application;
    detecting a second air gesture from the user; and
    in response to detecting the second air gesture from the user:
        displaying a second indication icon on a side edge of the second display interface for sliding upward or downward;
        moving the second indication icon in a second preset direction on the second display interface along a second moving trajectory of the second air gesture; and
        sliding the second display interface of the second application to turn to a second page.

2. The method of claim 1, wherein the first moving trajectory is in a direction of an x-axis of a rectangular coordinate system, wherein the x-axis is a horizontal direction in which the first display interface displays content, and wherein the method further comprises:
    obtaining a first moving distance of the first air gesture in the direction of the x-axis; and
    moving, based on the first moving distance, the first indication icon in the direction of the x-axis on the first display interface.

3. The method of claim 1, wherein the second moving trajectory is in a direction of a y-axis of a rectangular coordinate system, wherein the y-axis is a vertical direction in which the first display interface displays content, and wherein the method further comprises:
    obtaining a first moving distance of the second air gesture in the direction of the y-axis; and
    moving, based on the first moving distance, the second indication icon in the direction of the y-axis on the first display interface.

4. The method of claim 1, wherein before detecting the first air gesture or the second air gesture from the user, the method further comprises:
    detecting a preset gesture from the user for entering an air gesture operation mode; and
    displaying, in response to the preset gesture, the first indication icon or the second indication icon at a preset position of the first display interface.

5. The method of claim 4, wherein the preset position comprises the top, the bottom, or the side edge of the first display interface.

6. The method of claim 4, wherein the preset gesture is a hover gesture, and wherein the method comprises detecting, using an image, that the user inputs the hover gesture.

7. The method of claim 6, further comprising:
    detecting a position at which the hover gesture hovers;
    using the position as a start position; and
    detecting the first air gesture based on the start position and the image.

8. The method of claim 4, further comprising restoring displaying the first indication icon or the second indication icon at the preset position after the first air gesture or the second air gesture ends.

9. The method of claim 1, further comprising:
    reporting a sliding event to the first application based on a moving distance of the first air gesture along the first moving trajectory; and
    displaying a third display interface corresponding to the sliding event.

10. The method of claim 1, further comprising:
    detecting a preset gesture from the user for exiting an air gesture operation mode; and
    hiding, in response to the preset gesture, the first indication icon or the second indication icon.

11. The method of claim 1, wherein the first indication icon or the second indication icon comprises a progress bar, a slider, a line segment, or an arc, and wherein the method further comprises sliding, extending, or enlarging the first indication icon or the second indication icon.

12. The method of claim 1, wherein detecting the first air gesture and the second air gesture from the user comprises detecting, using an artificial intelligence (AI) engine, a first type of the first air gesture and a second type of the second air gesture.

13. An apparatus, comprising:
a memory configured to store instructions; and
one or more processors coupled to the memory and configured to execute the instructions to:
  display a first display interface of a first application;
  detect a first air gesture from a user;
  in response to detecting the first air gesture from the user:
    display a first indication icon on a top or a bottom of the first display interface for sliding left or right;
    move the first indication icon in a first preset direction on the first display interface along a first moving trajectory of the first air gesture; and
    slide the first display interface of the first application to turn to a first page;
  display a second display interface of a second application;
  detect a second air gesture from the user; and
  in response to detecting the second air gesture from the user:
    display a second indication icon on a side edge of the second display interface for sliding upward or downward;
    move the second indication icon in a second preset direction on the second display interface along a second moving trajectory of the second air gesture; and
    slide the second display interface of the second application to turn to a second page.

14. The apparatus of claim 13, wherein the first moving trajectory is in a direction of an x-axis of a rectangular coordinate system, wherein the x-axis is a horizontal direction in which the first display interface displays content, and wherein the instructions further cause the one or more processors to:
  obtain a first moving distance of the first air gesture in the direction of the x-axis; and
  move, based on the first moving distance, the first indication icon in the direction of the x-axis on the first display interface.

15. The apparatus of claim 13, wherein the second moving trajectory is in a direction of a y-axis of a rectangular coordinate system, wherein the y-axis is a vertical direction in which the first display interface displays content, and wherein the instructions further cause the one or more processors to:
  obtain a first moving distance of the second air gesture in the direction of the y-axis; and
  move, based on the first moving distance, the second indication icon in the direction of the y-axis on the first display interface.

16. The apparatus of claim 13, wherein before detecting the first air gesture or the second air gesture from the user, the instructions further cause the one or more processors to:
  detect a preset gesture from the user for entering an air gesture operation mode; and
  display, in response to the preset gesture, the first indication icon or the second indication icon at a preset position of the first display interface.

17. The apparatus of claim 16, wherein the preset position comprises the top, the bottom, or the side edge of the first display interface.

18. The apparatus of claim 16, wherein the preset gesture is a hover gesture, and wherein the instructions further cause the one or more processors to detect, using an image, that the user inputs the hover gesture.

19. The apparatus of claim 18, wherein the instructions further cause the one or more processors to:
  detect a position at which the hover gesture hovers;
  use the position as a start position; and
  detect the first air gesture based on the start position and the image.

20. A computer program product comprising computer-executable instructions stored on a non-transitory computer-readable medium that, when executed by one or more processors, cause an apparatus to:
  display a first display interface of a first application;
  detect a first air gesture from a user;
  in response to detecting the first air gesture from the user:
    display a first indication icon on a top or a bottom of the first display interface for sliding left or right;
    move the first indication icon in a first preset direction on the first display interface along a first moving trajectory of the first air gesture; and
    slide the first display interface of the first application to turn to a first page;
  display a second display interface of a second application;
  detect a second air gesture from the user; and
  in response to detecting the second air gesture from the user:
    display a second indication icon on a side edge of the second display interface for sliding upward or downward;
    move the second indication icon in a second preset direction on the second display interface along a second moving trajectory of the second air gesture; and
    slide the second display interface of the second application to turn to a second page.

* * * * *